US012482353B1

(12) United States Patent
Baumgartner et al.

(10) Patent No.: US 12,482,353 B1
(45) Date of Patent: Nov. 25, 2025

(54) EMERGENCY VEHICLE DETECTION FOR AUTONOMOUS VEHICLE

(71) Applicant: Aurora Operations, Inc., Pittsburgh, PA (US)

(72) Inventors: Brian Baumgartner, San Francisco, CA (US); Nemanja Djuric, Pittsburgh, PA (US); Niels Joubert, Los Altos, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 54 days.

(21) Appl. No.: 18/390,920

(22) Filed: Dec. 20, 2023

Related U.S. Application Data

(60) Provisional application No. 63/434,343, filed on Dec. 21, 2022.

(51) Int. Cl.
| | |
|---|---|
| *G08G 1/0967* | (2006.01) |
| *B60W 60/00* | (2020.01) |
| *G08G 1/01* | (2006.01) |
| *G08G 1/017* | (2006.01) |

(52) U.S. Cl.
CPC ... *G08G 1/096725* (2013.01); *B60W 60/0025* (2020.02); *G08G 1/0112* (2013.01); *G08G 1/0175* (2013.01); *G08G 1/096775* (2013.01); *B60W 2420/403* (2013.01); *B60W 2554/402* (2020.02); *B60W 2554/404* (2020.02); *B60W 2556/45* (2020.02)

(58) Field of Classification Search
CPC ........... G08G 1/096725; G08G 1/0112; G08G 1/0175; G08G 1/096775; B60W 60/0025; B60W 2554/402; B60W 2556/45; B60W 2554/404; B60W 2420/403
USPC ......................................................... 701/24
See application file for complete search history.

(56) References Cited

U.S. PATENT DOCUMENTS

| | | | |
|---|---|---|---|
| 10,268,191 B1 * | 4/2019 | Lockwood | G05D 1/2279 |
| 10,976,732 B2 * | 4/2021 | Lockwood | G05D 1/2246 |
| 11,016,485 B2 * | 5/2021 | Pedersen | G05D 1/0038 |
| 11,176,831 B2 * | 11/2021 | Magzimof | G05D 1/0214 |
| 11,560,154 B1 * | 1/2023 | Gate | G01C 21/3614 |
| 11,595,619 B1 * | 2/2023 | Gate | G05D 1/0038 |
| 11,644,830 B1 * | 5/2023 | Gate | G05D 1/0038 |
| | | | 701/2 |
| 11,938,963 B1 * | 3/2024 | Joubert | B60W 40/10 |
| 12,013,256 B1 * | 6/2024 | Kaplan | G01C 21/3848 |
| 12,151,706 B2 * | 11/2024 | Joubert | B60W 60/001 |

(Continued)

*Primary Examiner* — Luis A Martinez Borrero
(74) *Attorney, Agent, or Firm* — Gray Ice Higdon

(57) ABSTRACT

A teleassist system may be used to assist with detecting and responding to an emergency vehicle present within an environment of an autonomous vehicle. The teleassist system can help confirm whether the emergency vehicle is active or inactive based on evaluating sensor data that is captured by one or more sensors of the autonomous vehicle and that is associated with the emergency vehicle. For example, the teleassist system can provide a teleassist operator input confirming whether a detected vehicle is an emergency vehicle based on evaluation of various aspects, including siren, vehicle shape, vehicle color, and/or flashing light emitted by flash device(s) of the vehicle, etc. The teleassist operator input can further include one or more suggested autonomous vehicle control operations that enable the autonomous vehicle to comply with detection of an emergency vehicle.

26 Claims, 11 Drawing Sheets

(56) References Cited

U.S. PATENT DOCUMENTS

| | | | |
|---|---|---|---|
| 12,207,166 B2* | 1/2025 | Li | B60W 60/00253 |
| 2019/0187691 A1* | 6/2019 | Magzimof | G05D 1/0088 |
| 2020/0062267 A1* | 2/2020 | Magzimof | B60W 50/082 |
| 2020/0324761 A1* | 10/2020 | Magzimof | B60W 30/09 |
| 2020/0409352 A1* | 12/2020 | Caldwell | G05D 1/0214 |
| 2020/0409368 A1* | 12/2020 | Caldwell | G05D 1/0044 |
| 2021/0078595 A1* | 3/2021 | Magzimof | G08G 1/20 |
| 2021/0078602 A1* | 3/2021 | Wray | H04L 63/1425 |
| 2021/0116907 A1* | 4/2021 | Altman | G05D 1/223 |
| 2021/0163021 A1* | 6/2021 | Frazzoli | H04W 4/48 |
| 2021/0312798 A1* | 10/2021 | Huang | G01C 21/3837 |
| 2021/0325880 A1* | 10/2021 | Gogna | B60W 30/0956 |
| 2023/0322260 A1* | 10/2023 | Paxton | G07C 5/02 |
| | | | 701/23 |
| 2024/0059313 A1* | 2/2024 | Tong | G05D 1/6987 |
| 2024/0217546 A1* | 7/2024 | Joubert | B60W 40/10 |
| 2025/0065912 A1* | 2/2025 | Joubert | G01C 21/3848 |
| 2025/0077942 A1* | 3/2025 | Chaabane | G06V 20/588 |
| 2025/0083691 A1* | 3/2025 | Stumpf | B60W 60/001 |

\* cited by examiner

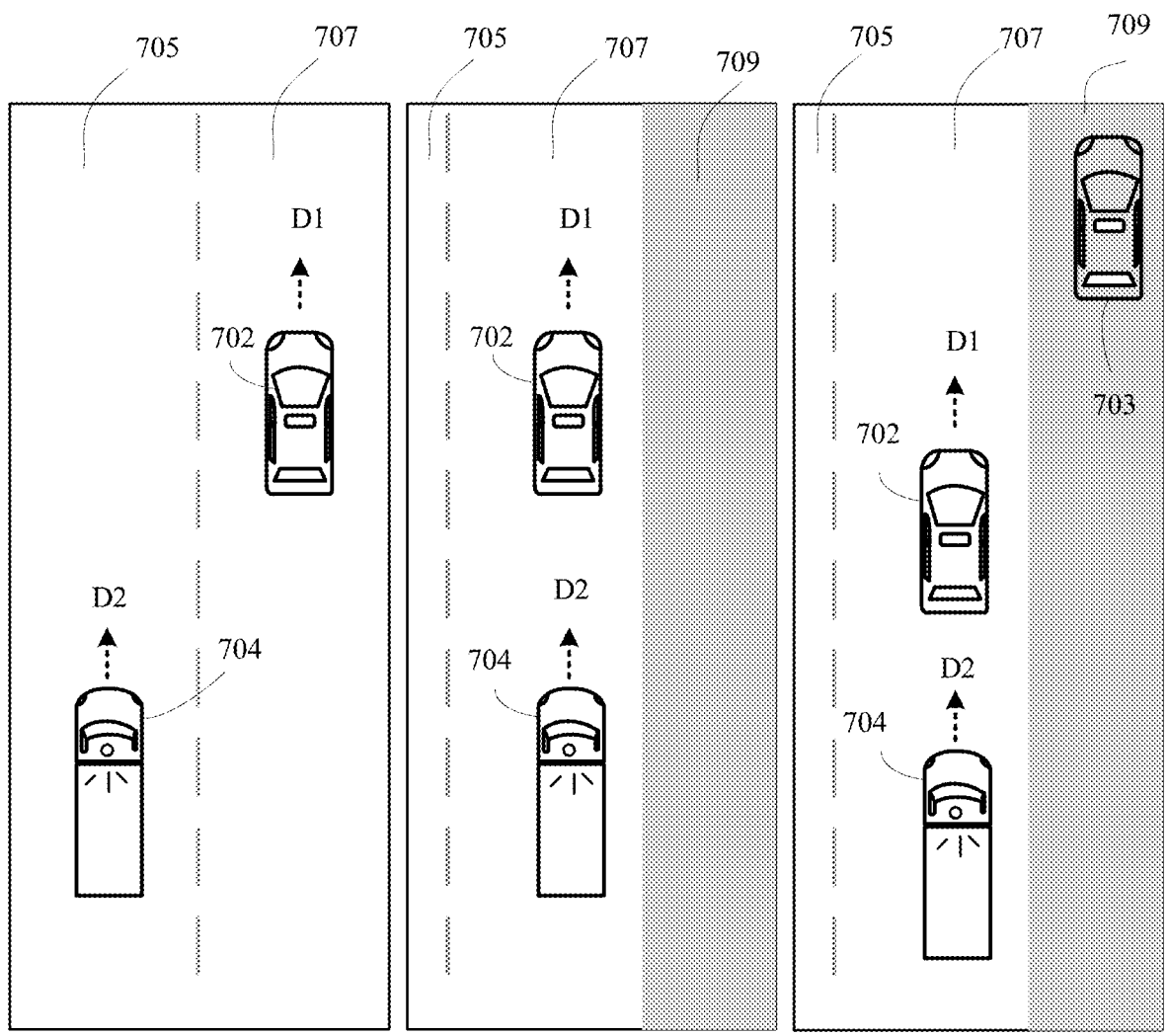
*FIG. 7A*  *FIG. 7B*  *FIG. 7C*

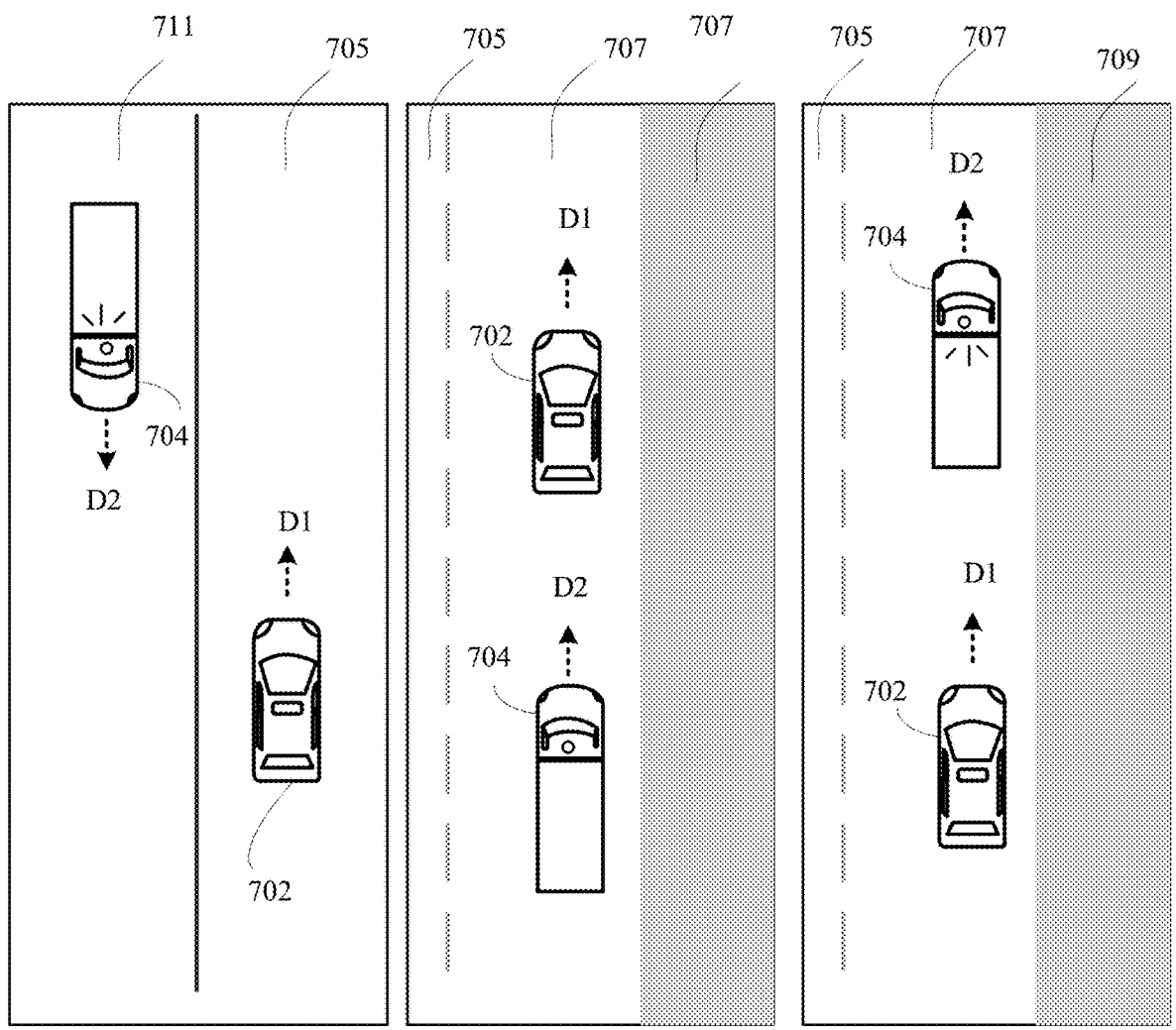
*FIG. 7D*  *FIG. 7E*  *FIG. 7F*

EMERGENCY VEHICLE DETECTION FOR AUTONOMOUS VEHICLE

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about an autonomous vehicle's surrounding environment, along with making and implementing decisions to appropriately control the autonomous vehicle given a current environment within which the autonomous vehicle is operating. While usually presenting expected conditions such as regular vehicle(s) driving in front of, behind, or passing the autonomous vehicle, the current environment of the autonomous vehicles can also present irregular conditions such as the sudden presence of an emergency vehicle crossing an intersection at a high speed regardless of the existence of a traffic light or stop sign. In situations like this, the autonomous vehicle needs to yield to the emergency vehicles in a timely and reliable manner.

SUMMARY

Implementations described herein are generally directed to the use of a remote teleassist system to assist an autonomous vehicle with the detection of and/or response to an emergency vehicle (e.g., an ambulance, firetruck, police car, police motorcycle, rescue vehicle, etc.) that is present within an environment of an autonomous vehicle. The autonomous vehicle can be in communication with the teleassist system, to receive teleassist operator input that enables the autonomous vehicle to operate more appropriately in the environment of the autonomous vehicle when an emergency vehicle is detected.

As a non-limiting practical example, the autonomous vehicle can transmit sensor data (and/or other information such as messages) to the teleassist system and receive one or more teleassist operator inputs from the teleassist system, where the one or more teleassist operator inputs can be based on the sensor data and from a teleassist operator. The transmission of the sensor data and the receiving of the one or more teleassist operator inputs can be through a teleassist session established between the teleassist system and the autonomous vehicle. The sensor data sent by the autonomous vehicle can, for instance, indicate an environment state (e.g., existence of a siren specific to an emergency vehicle, detection of the emergency vehicle behind the autonomous vehicle, etc.) of the autonomous vehicle. Alternatively or additionally, the sensor data sent by the autonomous vehicle can indicate a vehicle state (e.g., location, speed, current lane, etc.) of the autonomous vehicle. The aforementioned one or more teleassist operator inputs can be received by the teleassist system from a teleassist operator, via a user interface of the teleassist system, where the one or more teleassist operator inputs are then transmitted to the autonomous vehicle to recommend one or more operations in controlling the autonomous vehicle. By performing the one or more operations recommended by the one or more teleassist operator inputs, the autonomous vehicle can drive more appropriately and responsively in an environment where an emergency vehicle is encountered, even in instances where an emergency vehicle is operating in a manner that differs from normal traffic (e.g., traveling at a high rate, disobeying normal travel restrictions such as stop lights, etc.).

In various implementations, an autonomous vehicle control system is provided, where the autonomous vehicle control system can include one or more processors configured to operate an autonomous vehicle in an environment having one or more roads, buildings, or other objects. For instance, the autonomous vehicle control system can be installed at the autonomous vehicle, and the autonomous vehicle can include one or more sensors (e.g., acoustic sensors, image-capturing sensors, GPS, etc.) disposed on the autonomous vehicle.

In some implementations, the one or more sensors can detect a first set of sensor data, and the autonomous vehicle control system can process the first set of sensor data to detect the presence of an emergency vehicle in the environment of the autonomous vehicle, based on the first set of sensor data. For instance, the first set of sensor data can include audio data, collected by one or more acoustic sensors, that capture a siren emitted by the emergency vehicle. In this instance, the autonomous vehicle control system can determine the presence of the emergency vehicle based on the siren detected from the first set of sensor data being specific to one of a plurality of emergency vehicles. Alternatively or additionally, the first set of sensor data can include one or more images (or videos) captured by one or more image-capturing sensors (e.g., cameras, or video-capturing sensors), that describe a visual appearance (e.g., shape, color, logo on vehicle body, flashing light, etc.) of the emergency vehicle. In this instance, the autonomous vehicle control system can determine the presence of the emergency vehicle based on the visual appearance of the emergency vehicle that is specific to one of a plurality of emergency vehicles.

In some implementations, in response to detecting the presence of the emergency vehicle in the environment of the autonomous vehicle, the autonomous vehicle control system can communicate with a teleassist system to initiate a teleassist session for communication or information exchange between the autonomous vehicle and the teleassist system. In some implementations, in response to the teleassist session being initiated successfully, the autonomous vehicle control system can transmit a second set of sensor data to the teleassist system, where the second set of sensor data can be captured by the aforementioned one or more sensors (or a portion thereof) and is associated with one or more conditions of the emergency vehicle, which may be (but does not necessarily need to be) determined or partially determined using the first set of sensor data.

The second set of sensor data can be the same as the first set of sensor data. Alternatively, the second set of sensor data can be partially or completely different from the first set of sensor data. For instance, while the first set of sensor data (e.g., audio data capturing a siren specific to an emergency vehicle) may allow the autonomous vehicle control system to detect the presence of the emergency vehicle, the second set of sensor data (e.g., the audio data capturing the siren specific to the emergency vehicle and video data capturing the emergency vehicle approaching the autonomous vehicle from behind) may indicate additional information (e.g., one or more conditions of the emergency vehicle such as whether the emergency vehicle is active or inactive, an approximate location, a speed, or a driving direction of the emergency vehicle, etc.) of the emergency vehicle, other than the presence of the emergency vehicle. In other words, in some instances, the second set of sensor data can include at least portion of the first set of sensor data, or the second set of sensor data can be captured entirely subsequent to the first set of sensor data so that the second set of sensor data includes no data from the first set of sensor data.

As a non-limiting practical example and for the sole purpose of illustration, the first set of sensor data can include: audio data at $T_1$ that captures a siren specific to an emergency vehicle, and a first image at $T_2$ that captures the emergency vehicle behind (e.g., 100 m behind) the autonomous vehicle, where $T_2$ is approximately the same as or subsequent to $T_1$. In this example, the second set of sensor data can at least include the first image capturing the emergency vehicle approximately 100 m behind the autonomous vehicle. Or, instead of or in addition to the first image, the second set of sensor data can include a second image capturing the emergency behind (e.g., 80 m behind) vehicle at a more recent point of time $T_3$, which is subsequent to $T_2$.

Optionally or additionally, the second set of sensor data transmitted to the remote teleassist system includes path data of the emergency vehicle indicating a location, a driving direction and/or a driving speed of the emergency vehicle at one or more points of time. In this case, the aforementioned one or more conditions of the emergency vehicle can further include a path or trajectory of the emergency vehicle generated based on the path data. Optionally, the location of the emergency vehicle, for instance, can be determined based on LIDAR data captured using one or more LIDAR sensors, which can be a part of the aforementioned one or more sensors.

In some implementations, after receiving the second set of sensor data from the autonomous vehicle control system, the teleassist system can cause the second set of sensor data (or a portion thereof, after processing the second set of sensor data) to be presented to a teleassist operator. For instance, the teleassist system can include one or more displays, and render image data, video data, or location data, etc., of the second set of sensor data, to the teleassist operator via the one or more displays. The teleassist system can alternatively or additionally include other components (e.g., speakers to deliver the audio data capturing a siren specific to an emergency vehicle) and more descriptions can be found later in this specification.

In some implementations, teleassist operator input that suggests or recommends one or more vehicle control operations to control operation of the autonomous vehicle responsive to the one or more conditions of the emergency vehicle can be received from the teleassist operator, via a user interface of the teleassist system. As a non-limiting example, the teleassist operator input can be a confirmation that an active ambulance is approaching the autonomous vehicle from behind, as well as a command or suggestion instructing the autonomous vehicle to pull over to the right shoulder as soon as possible. As another example, the teleassist operator input can include a selection of an input corresponding to "emergency vehicle detected" and further include a selection of an input corresponding to "pull over to the right shoulder as soon as possible". More descriptions and examples of the teleassist operator input will be provided later in this disclosure.

In some implementations, the teleassist system can transmit the teleassist operator input that suggests the one or more vehicle control operations to the autonomous vehicle control system, so that the autonomous vehicle control system can control operation of the autonomous vehicle based on the teleassist operator input, responsive to the presence and the one or more conditions of the emergency vehicle. Continuing with the non-limiting example above, after receiving the teleassist operator input (i.e., the text saying "ambulance detected right behind, pull over to the right shoulder immediately") from the teleassist system (e.g., remote from the autonomous vehicle), the autonomous vehicle can validate the teleassist operator input. As a non-limiting example, the autonomous vehicle control system can validate the teleassist operator input using, e.g., the aforementioned planning subsystem. If the planning subsystem validates such teleassist operator input, the autonomous vehicle control system controls the autonomous vehicle to pull over to the right shoulder. If the planning subsystem invalidates such teleassist operator input, the autonomous vehicle control system may discard the teleassist operator input or may message from the teleassist system that is generated based on the teleassist operator input. Alternatively, the autonomous vehicle control system can control the autonomous vehicle to perform an action based on the teleassist operator input, where the action performed by the autonomous vehicle can be different from (or can be modified using) vehicle control operation suggested by the teleassist operator input.

Optionally, continuing with the non-limiting example above, the one or more vehicle control operations suggested by the teleassist operator input can include a further vehicle control operation of "continue driving at the shoulder", given that the second set of sensor data includes at least an image or a video showing no vehicles on the right shoulder. In other words, the teleassist operator input can be, e.g., "ambulance detected right behind, pull over to the right shoulder immediately and continue driving at the shoulder".

Alternatively, the further vehicle control operation of "continue driving at the shoulder" can be suggested by an additional teleassist operator input that is received from the teleassist system and that is subsequent to receiving the aforementioned teleassist operator input. The additional teleassist operator input here can be based on a third set of sensor data transmitted from the autonomous vehicle control system to the teleassist system, where the third set of sensor data for instance, includes an image or video showing no vehicle in front of the autonomous vehicle when the autonomous vehicle enters the shoulder or is driving along the shoulder and cannot return to the normal driving lane due to the emergency vehicle.

In some implementations, the teleassist session may not be initiated successfully. For example, the teleassist system may not respond to a request from the autonomous vehicle control system to communicate, or the teleassist session may not be initiated within a predetermined period to be responsive. In these implementations, the autonomous vehicle control system can, in response to detecting the presence of the emergency vehicle in the environment of the autonomous vehicle, execute one or more default vehicle control operations. The one or more default vehicle control operations can, for instance, be determined based on one or more conditions of the autonomous vehicle, and/or based on the one or more conditions of the emergency vehicle indicated by the first or second set of sensor data.

As a non-limiting example, the one or more conditions of the autonomous vehicle can indicate that the autonomous vehicle is driving along a road, and the one or more default vehicle control operations include a first default vehicle control operation that controls the autonomous vehicle to stop driving. For instance, if the autonomous vehicle control system determines that the one or more conditions of the emergency vehicle indicate that (1) the emergency vehicle is approaching the autonomous vehicle from behind and (2) the emergency vehicle is in a different (e.g., adjacent) lane from the autonomous vehicle, the autonomous vehicle control system can control the autonomous vehicle to stop driving, or slow down, Alternatively or additionally, the one or more default vehicle control operations include a second default vehicle control operation that controls the autonomous vehicle to pull over to a shoulder of the road. For instance, if the autonomous vehicle control system determines, e.g., from the second set of sensor data, that the one or more conditions of the emergency vehicle indicate the emergency vehicle is approaching the autonomous vehicle from behind and is in the same lane as the autonomous vehicle, the autonomous vehicle control system can control the autonomous vehicle to perform the second default vehicle control operation, i.e., pull over to a shoulder of the road.

As another non-limiting example, the one or more conditions of the emergency vehicle can indicate that the emergency vehicle is in an inactive state (meaning the emergency vehicle is used as a normal vehicle). In this example, the one or more default vehicle control operations can be, or include, for instance, an operation of controlling the autonomous vehicle to drive in a current lane at a current speed. In other words, in some cases, the autonomous vehicle control system may treat an inactive emergency vehicle as a normal vehicle, without performing particular control of the autonomous vehicle responsive to the detection of the inactive emergency vehicle. That is, the autonomous vehicle control system may continue nominal operation.

Optionally, in some implementations, the autonomous vehicle control system, or the teleassist system, can detect or determine a type of the emergency vehicle. For instance, the autonomous vehicle control system can determine an emergency vehicle type based on the siren matching a known emergency vehicle siren. In this instance, the autonomous vehicle control system can optionally transmit a message indicating the type of the emergency vehicle to the teleassist system during the aforementioned teleassist session. The message indicating the type of the emergency vehicle can be transmitted along with, prior to, or subsequent to the transmission of the second set of sensor data.

Alternatively or additionally, in another instance, the type of the emergency vehicle can be determined based on a shape and/or a color of the emergency vehicle. In this instance, a machine learning model trained to classify emergency vehicles can be utilized to process an image capturing a vehicle that surrounds the autonomous vehicle. The machine learning model can process such image as input, to generate a classification output indicating whether the captured vehicle is an emergency vehicle, and/or whether the captured vehicle is a particular type of emergency vehicle (e.g., ambulance, police vehicle, etc.). Alternatively or additionally, in a further instance, the type of the emergency vehicle can also be determined based on a flashing pattern and/or a color of a flashing light emitted by the emergency vehicle via one or more light-emitting devices (e.g., LED devices).

Optionally, in some implementations, the autonomous vehicle control system, or the teleassist system, can determine a state of the emergency vehicle indicating whether the emergency vehicle is active or inactive. Optionally, if the autonomous vehicle control system determines the state of the emergency vehicle, the autonomous vehicle control system can transmit a message indicating whether the emergency vehicle is active or inactive, to the teleassist system. As a non-limiting example, the autonomous vehicle control system can determine that the emergency vehicle is active based on the fact that the first set of sensor data includes the audio data capturing the siren sent by the emergency vehicle. In this example, the autonomous vehicle control system can transmit a message indicating that the emergency vehicle is active to the teleassist system.

Alternatively or additionally, the autonomous vehicle control system, or the teleassist system, can determine that the state of the emergency vehicle indicates that the emergency vehicle is active based on the visual appearance of the emergency vehicle captured in one or more images (or videos) that form a part of the first or second set of sensor data. For instance, the autonomous vehicle control system can process the one or more images (or videos) to determine whether flashing light having one or more particular features (e.g., color and/or pattern) specific to one of a plurality of emergency vehicles is detected (e.g., near a top of the emergency vehicle to which one or more LED devices are often attached).

By using the techniques described herein, one or more technical advantages can be achieved. As one non-limiting example, the techniques described herein enable the autonomous vehicle to receive teleassist operator input that recommends one or more operations in controlling the autonomous vehicle, in response to detecting an emergency vehicle in an environment of the autonomous vehicle. Here, the teleassist operator input can be generated based on sensor data collected by a plurality of sensors that are disposed at different areas of the autonomous vehicle and that are of different types and/or pointing angles. As a result, the autonomous vehicle can be controlled to drive appropriately in the environment within which an emergency vehicle is detected, by performing actions (e.g., stop) conforming to traffic rules applicable to situations involving emergency vehicles.

As another non-limiting example, the techniques described herein enable the autonomous vehicle control system and/or the teleassist system to determine whether an emergency vehicle is active or inactive via different types of sensor data. As a result, the autonomous vehicle can respond to active emergency vehicle(s) and inactive emergency vehicle(s) differently, thereby being smart in utilizing computational and/or network resources (e.g., by ending a teleassist session as soon as the emergency vehicle is detected to be inactive) while also being responsive (e.g., monitoring an active emergency vehicle at different points of time with corresponding responsive actions, e.g., stop, pull over, drive along a shoulder temporally, etc.).

The above description is provided as an overview of only some implementations disclosed herein for the sake of example. Those implementations, and other implementations, are described in additional detail herein. It should be understood that techniques disclosed herein can be implemented locally on a client device, remotely by server(s) connected to the client device via one or more networks, and/or both.

BRIEF DESCRIPTION OF THE DRAWINGS

FIG. 7A, FIG. 7B, FIG. 7C, FIG. 7D, FIG. 7E, FIG. 7F respectively illustrates an example environment of an autonomous vehicle, where a teleassist system or service is applied to provide recommended command(s) or vehicle control operations(s), to handle a respective situation where an emergency vehicle is detected within the environment of the autonomous vehicle.

DETAILED DESCRIPTION

The various implementations discussed hereinafter are generally directed to a teleassist system for use with an autonomous vehicle, where the teleassist system can assist the autonomous vehicle with the detection of and/or response to an emergency vehicle that is or becomes present in an environment of the autonomous vehicle.

Figure 1:
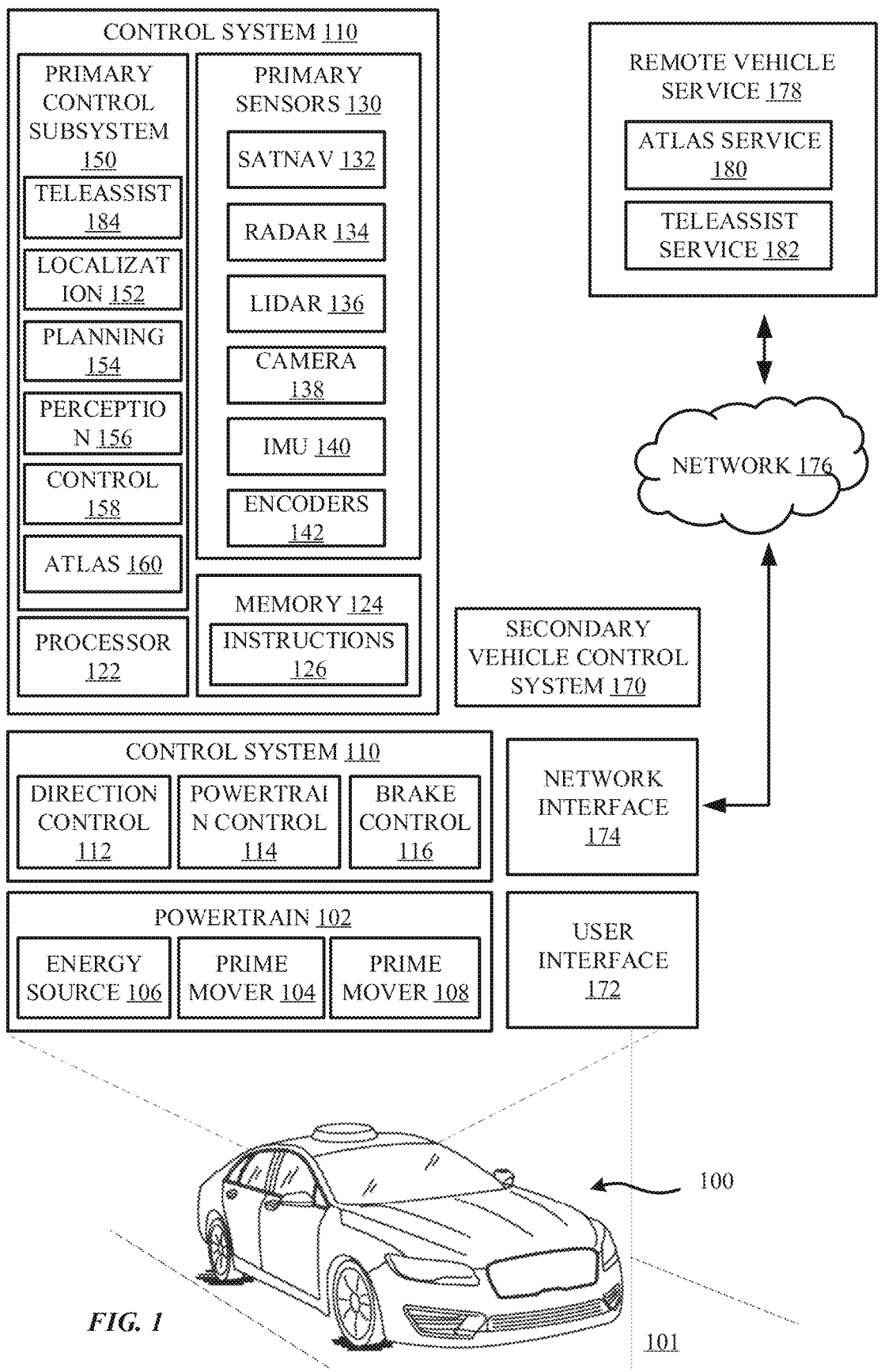
FIG. 1 illustrates an example hardware and software environment for an autonomous vehicle.

FIG. 1 illustrates an example autonomous vehicle 100 within which the various techniques disclosed herein may be implemented. The autonomous vehicle 100, for example, is shown driving on a road 101, and the autonomous vehicle 100 may include a powertrain 102 including a prime mover 104. The prime mover 104 can be powered by an energy source 106, and be capable of providing power to a drivetrain 108, as well as to a control system 110, where the control system 110 can include a direction control 112, a powertrain control 114 and a brake control 116. The autonomous vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others). The energy source 106 may include a fuel system (e.g., providing gasoline, diesel, hydrogen, etc.), a battery system, solar panels or other renewable energy source, a fuel cell system, etc. The drivetrain 108 may include wheels and/or tires along with a transmission and/or any other mechanical drive components suitable for converting the output of the prime mover 104 into vehicular motion. The drivetrain 108 may further include: one or more brakes configured to controllably stop or slow the vehicle, and direction or steering components suitable for controlling the trajectory of the vehicle. The direction or steering components, for instance, can include a rack and pinion steering linkage that enables one or more wheels of the autonomous vehicle 100 to pivot about a generally vertical axis, thereby varying an angle of the rotational planes of the wheels relative to the longitudinal axis of the autonomous vehicle 100. In some implementations, combinations of powertrains and energy sources may be used, e.g., in the case of electric/gas hybrid vehicles, and in some instances, multiple electric motors (e.g., dedicated to individual wheels or axles) may be used as a prime mover. In the case of a hydrogen fuel cell implementation, the prime mover 104 may include one or more electric motors, and the energy source 106 may include a fuel cell system powered by hydrogen fuel.

The direction control 112 may include one or more actuators and/or sensors for controlling and receiving feedback from the direction or steering components to enable the vehicle to follow a desired trajectory. The powertrain control 114 may be configured to control the output of powertrain 102, e.g., to control the output power of prime mover 104, to control a gear of a transmission in drivetrain 108, etc., thereby controlling a speed and/or direction of the autonomous vehicle 100. The brake control 116 may be configured to control one or more brakes that slow or stop the autonomous vehicle 100, e.g., disk or drum brakes coupled to the wheels of the autonomous vehicle 100.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over the autonomous vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from an environment of the autonomous vehicle 100, for use in controlling the operation of the autonomous vehicle 100 within the environment. The primary sensor system 130, for example, may include a satellite navigation (SATNAV) sensor 132, a radio detection and ranging (RADAR) sensor 134, a light detection and ranging (LIDAR) sensor 136, a digital camera 138, an inertial measurement unit (IMU) 140, and/or one or more wheel encoders 142. The primary sensor system 130 may further include one or more acoustic sensors (not shown), such as microphones or other devices that capture audio data from the environment of the autonomous vehicle.

The SATNAV sensor 132 may be compatible with any of various satellite navigation systems such as GPS, GLONASS, Galileo, Compass, etc., and may be used to determine the location of the autonomous vehicle 100 on the Earth using satellite signals. The RADAR sensor 134, the LIDAR sensor 136, as well as the digital camera 138 (which may include various types of image-capturing devices capable of capturing still and/or video imagery), may be used to sense stationary and moving objects within the immediate vicinity of the autonomous vehicle 100. The IMU 140 may include multiple gyroscopes and accelerometers that are capable of detection linear and rotational motion of the autonomous vehicle 100 in three directions, while the one or more wheel encoders 142 may be used to monitor the rotation of one or more wheels of the autonomous vehicle 100.

The outputs of sensors 132-142 may be provided to a set of primary control subsystems 150, including, for example, a localization subsystem 152, a planning subsystem 154, a perception subsystem 156, and a control subsystem 158. The localization subsystem 152 is principally responsible for precisely determining the location and orientation (also sometimes referred to as "pose", which in some instances may also include one or more velocities and/or accelerations) of the autonomous vehicle 100 within its surrounding environment, and generally within some frame of reference. The planning subsystem 154 is principally responsible for planning a path of motion for the autonomous vehicle 100 over some timeframe given a desired destination as well as objects (static and/or moving) within the environment, while the perception subsystem 156 is principally responsible for detecting, tracking and/or identifying elements (e.g., objects) within the environment surrounding the autonomous vehicle 100. The control subsystem 158 is principally responsible for generating suitable control signals for controlling the various controls in the control system 110 in order to implement the planned path of the autonomous vehicle 100. Any number of, or all of, the localization subsystem 152, planning subsystem 154, perception subsystem 156, and control subsystem 158 may have associated data that is generated and/or utilized in connection with the operation thereof, and that which may be communicated to a teleassist system 184 in some implementations.

In addition, an atlas or map subsystem 160 may be provided in the illustrated implementations to describe the elements within an environment and the relationships therebetween. The atlas subsystem 160 may be accessed by each of the localization, planning, perception, and control subsystems 152-156 to obtain various information about the environment for use in performing their respective functions. The atlas subsystem 160 may be used to provide map data to the autonomous vehicle control system, which may be used for various purposes in an autonomous vehicle, including for localization, planning, and perception, among other purposes. Map data may be used, for example, to lay out or place elements within a particular geographical area, including, for example, elements that represent real world objects such as roadways, boundaries (e.g., barriers, lane dividers, medians, etc.), buildings, traffic devices (e.g., traffic or road signs, lights, etc.), as well as elements that are more logical or virtual in nature, e.g., elements that represent valid pathways a vehicle may take within an environment, "virtual" boundaries such as lane markings, or elements that represent logical collections or sets of other elements. Map data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In some implementations, the atlas subsystem 160 may provide map data in a format in which the positions of at least some of the elements in a geographical area are defined principally based upon relative positioning between elements rather than any absolute positioning within a global coordinate system. It will be appreciated, however, that other atlas or map systems suitable for maintaining map data for use by the autonomous vehicle 100 may be used in other implementations, including systems based upon absolute positioning. Furthermore, it will be appreciated that at least some of the map data that is generated and/or utilized by the atlas subsystem 160 may be communicated to the teleassist system 184 in some implementations.

It will be appreciated that the collection of components illustrated in FIG. 1 for the primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while the subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executable by one or more processors 122. It will be further appreciated that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in the primary vehicle control system 120 may be networked in various manners.

In some implementations, the autonomous vehicle 100 may also include a secondary vehicle control system 170, which may be used as a redundant or backup control system for the autonomous vehicle 100. In some implementations, secondary vehicle control system 170 may be capable of fully operating the autonomous vehicle 100 in the event of an adverse event in the primary vehicle control system 120, while in other implementations, the secondary vehicle control system 170 may only have limited functionality, e.g., to perform a controlled stop of the autonomous vehicle 100 in response to an adverse event (e.g., an emergency vehicle fast approaches the autonomous vehicle 100 from behind) detected using the primary vehicle control system 120. In still other implementations, the secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the autonomous vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in the autonomous vehicle 100 outside of the purposes of autonomous control, e.g., to control entertainment systems, to operate doors, lights, convenience features, etc.

In addition, for additional storage, the autonomous vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, the autonomous vehicle 100 may include a user interface (I/F) 172 to enable the autonomous vehicle 100 to receive a number of inputs from a user or an operator (e.g., a remote teleassist operator of the teleassist subsystem 184), and to present outputs for the user or the operator, via, for instance, one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, the autonomous vehicle 100 may include one or more network interfaces (I/Fs), e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which the autonomous vehicle 100 receives environmental and other data for use in autonomous control thereof. In the illustrated implementations, for example, the autonomous vehicle 100 may be in communication with a cloud-based remote vehicle service 178 including, at least for the purposes of implementing various functions described herein, an atlas or map service or system 180 and a teleassist service or system 182. The atlas or map service or system 180 may be used, for example, to maintain a global repository describing one or more geographical regions of the world, as well as to deploy portions of the global repository to one or more autonomous vehicles (e.g., including the autonomous vehicle 100), to update the global repository based upon information received from one or more autonomous vehicles, and to otherwise manage the global repository. The teleassist service or system 182 may be used, for example, to provide teleassist support to the autonomous vehicle 100, e.g., through communication with the teleassist subsystem 184 resident in the primary vehicle control system 120, as will be discussed in greater detail below.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to the autonomous vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary hardware and/or software components illustrated in FIG. 1 is not intended to limit the present invention. Indeed, those skilled in the art will recognize that other alternative or additional hardware and/or software components may be used without departing from the scope of the invention.

Operating the autonomous vehicle 100 in the complex and dynamic environments within which automobiles regularly operate often necessitates handling a diverse array of conditions that, while comparatively uncommon, are still regularly encountered by the autonomous vehicle 100 or other autonomous vehicles over time. Autonomously handling these uncommon conditions in both a performant and safe way can be challenging, and some proposed approaches to addressing these uncommon conditions incorporate the use of teleassist ("human-in-the-loop") technology, to enable a human operator, who may be remote from the vehicle, to make decisions and assist in guiding a vehicle (e.g., the autonomous vehicle 100) whenever some of these uncommon conditions are encountered by the vehicle.

Some proposed teleassist approaches focus on direct control of the autonomous vehicle 100 by a remote operator, whereby the remote operator is provided with sensor data collected by the autonomous vehicle 100 and is able to directly control the autonomous vehicle 100 remotely. It has been found, however, that direct control of the autonomous vehicle 100 in such circumstances generally requires a fast, responsive and reliable network connection between the remote operator and the autonomous vehicle 100. Network connectivity and latency for the autonomous vehicle 100, however, can vary considerably based upon location (e.g., urban or rural, highway or side road, etc.) and network congestion. In addition, remote operators, even when provided with sensor data collected by the autonomous vehicle 100, may still lack full situational awareness due to the fact that they are not physically within the vehicle.

The disclosed implementations, on the other hand, focus on an indirect control methodology whereby the teleassist service 182 is able to provide suggestions or recommendations to the autonomous vehicle 100, while requiring any such directives or recommendations to be validated by the autonomous vehicle 100 prior to being implemented. By doing so, safety and/or performance of the vehicle may be effectively decoupled from the performance of the network that links the teleassist service with the autonomous vehicle.

Figure 2A:
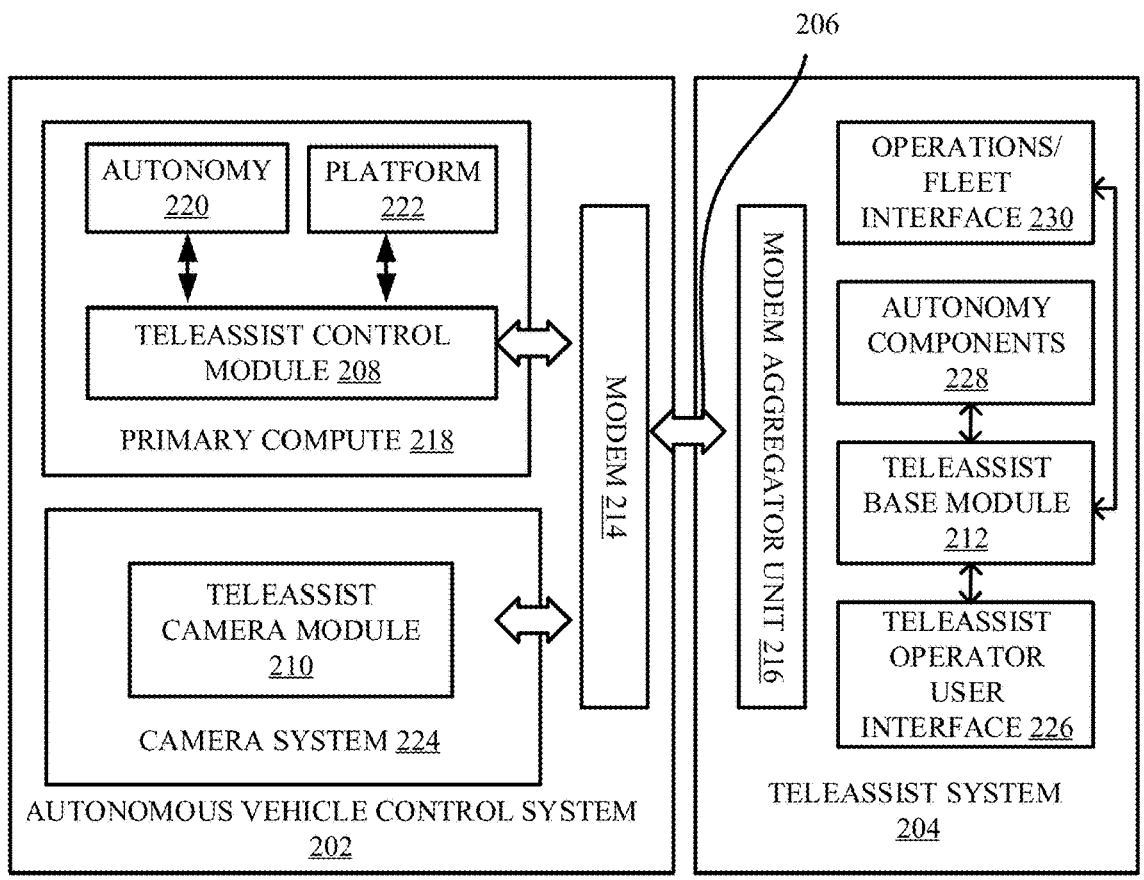
FIG. 2A is a block diagram illustrating an example teleassist-enabled system consistent with some implementations.

FIG. 2A illustrates a non-limiting example implementation of a teleassist-enabled system (or service) 200. As shown in FIG. 2A, an autonomous vehicle 202 can interface with a teleassist system 204 that is remote to the autonomous vehicle 202, over a network 206. The teleassist system 204 may be physically remote from the autonomous vehicle 202, and will generally support interface with multiple vehicles (including the autonomous vehicle 202) to enable multiple teleassist operators to concurrently interact with the multiple vehicles. As will become more apparent below, teleassist operators may actively and continuously monitor individual vehicles in some implementations, while in other implementations, individual teleassist operators may interact with multiple vehicles at different times, e.g., so that a particular operator may support multiple vehicles at one time. In some implementations, for example, teleassist operators may be selectively coupled to particular autonomous vehicles on an on-demand basis, e.g., in response to requests generated by the vehicles whenever certain conditions (e.g., various uncommon situations that may benefit from teleassist support) arise. In some implementations, a pool of operators may support a pool of autonomous vehicles, and the teleassist system 204 may initiate, or approve the initiation of, teleassist sessions on an on-demand basis, e.g., based upon requests initiated by autonomous vehicles, the teleassist system, or both.

Teleassist support may be implemented in some implementations using a teleassist control module 208, as well as a teleassist camera module 210, of the autonomous vehicle 202 that is in communication with a teleassist base module 212 of the teleassist system 204. The modules 208 and 210 of the autonomous vehicle 202 may be coupled to the network 206 through a modem 214, while the teleassist base module 212 of the teleassist system 204 may be coupled to the network 206 through a modem aggregator unit 216 that is capable of communicating with multiple modems 214 of multiple autonomous vehicles 202. The network 206 may be implemented in part using a wireless network such as a 4G, LTE or 5G network, a satellite network, or some combination thereof, although the invention is not so limited.

The teleassist control module 208 may be resident in some implementations within a primary compute system 218 of the autonomous vehicle 202, and may interface with each of an autonomy system 220 and platform 222 of the autonomous vehicle 202 to collect and stream data from the primary compute system 218 to the teleassist system 204 as well as receive and process teleassist operator inputs (sometimes referred to as "operator inputs") received from the teleassist system 204. In some implementations, the primary compute system 218 may be implemented in a similar manner to the primary vehicle control system 120 illustrated in FIG. 1, with the autonomy system 220 representing high level autonomous control subsystems such as localization, planning, perception, etc., and with the platform 222 representing lower level vehicle controls such as provided by control subsystem 158. However, it will be appreciated that teleassist control module 208 may interface with any autonomy or control-related aspect of the autonomous vehicle 202 in other implementations.

The teleassist camera module 210 may be resident in some implementations within a camera system 224 that manages the on-board cameras on the autonomous vehicle 202, and the teleassist camera module 210 may, in some implementations, stream camera feed data collected from the on-board cameras to the teleassist system 204 for viewing by an operator ("teleassist operator") during a teleassist session. As will become more apparent below, in some implementations, the teleassist camera module 210 may dynamically vary the data streamed from the on-board cameras, e.g., to vary the priority, quality and/or resolution of each camera feed.

While modules 208 and 210 are implemented separately in FIG. 2A, in other implementations, the functionality allocated to each module may vary, or the functionality may be combined into a single module or split into more than two modules. As such, the invention is not limited to the particular architecture illustrated in FIG. 2A.

The teleassist base module 212 communicates with modules 208 and 210 during a teleassist session with the autonomous vehicle 202, and may further manage multiple sessions for multiple vehicles and with multiple operators. The teleassist base module 212 may also manage scheduling, initiation and termination of sessions in some implementations.

A teleassist operator user interface 226 is coupled to the teleassist base module 212 to provide a user interface through which an operator, e.g., a human operator, may communicate with the autonomous vehicle 202 during a teleassist session. The teleassist operator user interface 226 may be implemented in any number of suitable manners, and may utilize text, graphics, video, audio, virtual or augmented reality, keyboard input, mouse input, touch input, voice input, gesture input, etc. Dedicated or customized controls and/or indicators may also be used in some implementations. In addition, in some implementations an application, e.g., as may execute on a desktop computer or laptop computer, a mobile device, etc. may be utilized to interact with an operator, while in other implementations a web-based or remote interface may be used. In one example implementation, the teleassist operator user interface 226 may be a web-based interface that interacts with an operator via a touchscreen display.

The teleassist system 204 may also include one or more autonomy components 228 interfaced with the teleassist operator user module 212. The autonomy components 228 may include various components that replicate the functionality of similar components in the autonomous vehicle 202 and/or that are also accessible to the autonomous vehicle 202 for use in connection with the primary control of the autonomous vehicle 220 (e.g., components 240, 242 and 244 discussed below in connection with FIG. 2B). For example, in some implementations, the teleassist operator user module 212 may have access to the same map data utilized by each vehicle, e.g., as provided by an atlas system as described above, as well as to similar layout functionality as is used by each vehicle to lay out map data in the immediate vicinity of the autonomous vehicle 202. By doing so, the teleassist operator user module 212 may effectively reconstruct a digital map of at least the fixed objects in the vicinity around the autonomous vehicle 202 without having to receive the entire digital map from the autonomous vehicle 202 itself, thereby reducing the volume of data streamed by the autonomous vehicle 202 for the purpose of reconstructing the environment around the autonomous vehicle 202.

In some implementations, the autonomous vehicle 202 may provide a current pose of the autonomous vehicle 202 as well as data regarding any dynamic entities (e.g., other vehicles, pedestrians, or other actors or objects detected in the environment but not represented in the map data) detected by the perception system, and from this more limited amount of data, a graphical depiction of the immediate vicinity around the autonomous vehicle 202 may be generated for display to a teleassist operator. In some implementations, the one or more autonomy components 228 may also replicate functionality implemented in the autonomous vehicle 202 to enable local assessment of how the autonomous vehicle 202 may respond to certain directives from the teleassist system 204. In some implementations, the one or more autonomy components 228 may have similar functionality to that implemented in the autonomous vehicle 202, but with greater capabilities and/or access to greater computing resources than may be available in the autonomous vehicle 202.

Moreover, in some implementations, the teleassist system 204 may be autonomous in nature as well, whereby the teleassist system 204 is effectively the teleassist operator with which the autonomous vehicle 202 interacts during a teleassist session. In such instances, the teleassist system 204 may assess the current context of the autonomous vehicle 202 and send commands, requests, directives, suggestions, etc. for addressing any conditions that triggered a teleassist session. In some implementations, for example, the teleassist system 204 may have access to more computing power than can practically be provided onboard the autonomous vehicle 202, and thus the teleassist system 204 may be capable of performing computationally complex evaluations to assist the autonomous vehicle 202.

The teleassist system 204 may also include an operations/fleet interface 230 to facilitate communication with other services that support autonomous vehicles. For example, it may be desirable in some implementations to provide an ability to request roadside assistance or recovery of the autonomous vehicle 202, or to provide log data for use in diagnosing vehicle issues associated with the autonomous vehicle 202. It may also be desirable to propagate data collected during a teleoperation session (e.g., data related to lane closures, detected construction or incidents, etc.) to other vehicles in a fleet. Moreover, data received and/or generated by the teleassist system 204 may be used as training data for further training various components of the autonomous vehicle 202, e.g., to improve the performance of a detector and reduce the occurrence of false positives, or to improve scenario selection and other decisions made by the autonomous vehicle 202 in response to certain sensor input. Other external services may also interface with the teleassist system 204 in other implementations, as well be apparent to those of ordinary skill having the benefit of the instant disclosure.

Figure 2B:
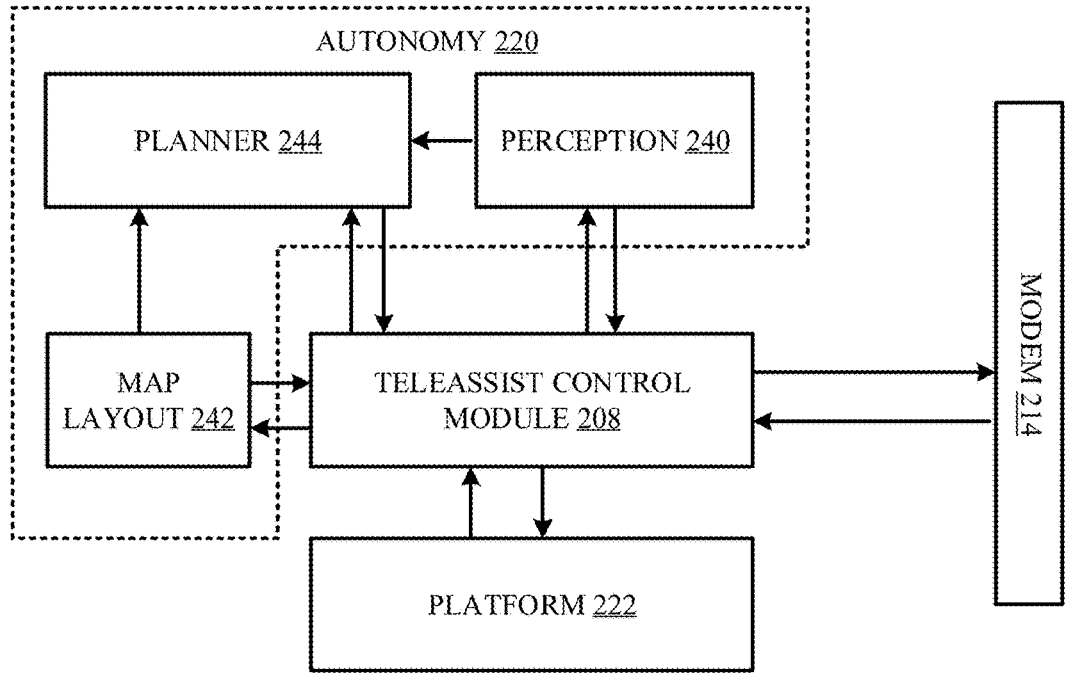
FIG. 2B is a block diagram further illustrating the teleassist control module referenced in FIG. 2A.

FIG. 2B provides an example implementation of the teleassist control module 208 in FIG. 2, as well as various interfaces supported thereby. As shown in FIG. 2B, in some implementations, the teleassist control module 208 may include one or more interfaces, e.g., application programming interfaces (APIs), to the teleassist system 204 (via the modem 212), to the platform 222, and to each of the perception component 240, map layout component 242, and planner component 244 of the autonomy component 220.

For the interface with the teleassist system 204, the teleassist control module 208 may be configured to communicate autonomy data (e.g., map data, perception data, route data, planning data), sensor data, telemetry data, etc. to the teleassist system 204 to provide the teleassist system 204 with the current status of the autonomous vehicle 202. The teleassist control module 208 may also be configured to communicate various teleassist requests to the teleassist system 204 and receive various teleassist commands therefrom. Further, the teleassist control module 208 may be configured to receive requests for visualizations and communicate requested visualizations to the teleassist system 204.

For the interface with platform 222, the teleassist control module 208 may be configured to receive vehicle state information (e.g., various types of diagnostic and/or sensor data) from the platform 222, and to issue various lower level commands to the platform 222, e.g., to honk a horn, activate or deactivate hazard lights, change gears, decommission the vehicle, initiate a controlled stop, etc.

For the interface with perception component 240, the teleassist control module 208 may be configured to receive from the perception component actors and/or tracks of actors detected in the environment, detections by various detectors 246 implemented in the perception component, and other perception-related data. All of such data may be communicated by the teleassist control module 208 to the teleassist system 204 as autonomy data.

For the interface with the map layout component 242, the teleassist control module 208 may receive, for example, local map data, route data and other map-related data from the map layout component 242. The teleassist control module 208 may also, in some instances, communicate map patches to the map layout component 242, e.g., to generate lane closures, traffic device overrides, new destinations, virtual path suggestions, etc., or to clear out prior generated map patches applied to the local map stored in the map layout component 242, e.g., when a prior lane closure has been removed. The map layout component 242 may also, in some instances, forward map and route updates to the planner component 244 to update scenarios being contemplated by the planner component 244 during the operation of the autonomous vehicle 202.

For the interface with the planner component 244, the teleassist control module 208 may receive, for example, generated plans, actor properties, alternate scenarios and other planning-related data. The teleassist control module 208 may also forward various teleassist commands to the planner component 244, as well as receive teleassist requests and/or feedback to teleassist commands from the planner component 244. Other functionality and variations will be appreciated by those of ordinary skill having the benefit of the instant disclosure. Therefore, the invention is not limited to the specific implementations of the teleassist system 204 discussed herein.

Figure 3:
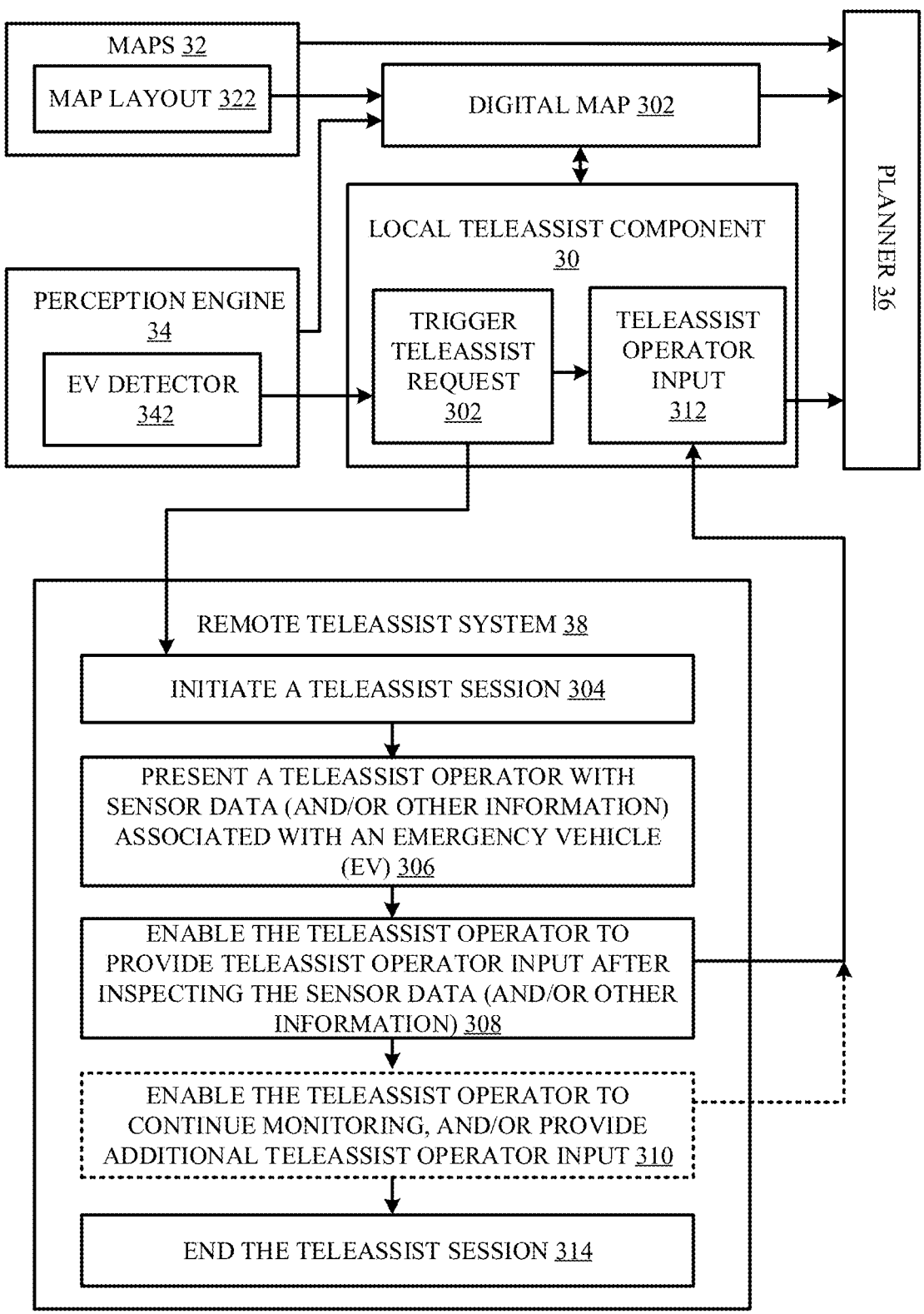
FIG. 3 is a block diagram illustrating an example teleassist-enabled system for emergency vehicle detection, consistent with various implementations.

FIG. 3 is a block diagram illustrating an example teleassist-enabled system 300 for detecting and/or responding to emergency vehicle(s), consistent with various implementations of this disclosure. As shown in FIG. 3, in various implementations, the example teleassist-enabled system 300 can include one or more maps 32, respectively or combined to show one or more static objects (building, bridge, lake, etc.) in an environment (e.g., see an example environment in FIG. 6A) of an autonomous vehicle. The one or more maps 32 can be stored locally or retrieved remotely, and can be utilized to generate a map layout 322 that displays location(s) of the one or more static objects based on a location of the autonomous vehicle.

In various implementations, the example teleassist-enabled system 300 can further include a perception engine 34 to detect, track, and/or identify one or more dynamic objects (e.g., bikes, vehicles, pedestrians, road-blocking barriers, etc., that are movable within the environment) and/or one or more dynamic properties (e.g., colors of traffic lights) of the aforementioned one or more static objects. For instance, the perception engine 34 can include an emergency vehicle detector ("EV detector") 342 to detect the presence of an emergency vehicle in the environment of the autonomous vehicle, and/or to determine a location, speed, and/or driving direction of the emergency vehicle. Optionally, the perception engine 34 can (but does not necessarily need to) include a traffic light detector (not shown) to detect a color, be it yellow, red, or green, of a traffic light, where the traffic light can be at an intersection which is shown in the map layout 322.

In various implementations, the example teleassist-enabled system 300 can generate a digital map 302 based on the one or more maps 32 and based on the one or more dynamic objects. For instance, the teleassist-enabled system 300 can generate the digital map 302 by integrating or fusing dynamic objects (e.g., road-blocking barriers, unmapped signs, new pavement or lane markings, signs on vehicles) selected from the aforementioned one or more dynamic objects with the map layout 322 to provide to the motion planner. As a result, the digital map 302 not only depicts the aforementioned one or more static objects, but also one or more selected dynamic objects, in the environment of the autonomous vehicle. Other dynamic objects, such as cars, pedestrians, and similar transient objects, may be provided to the motion planning system from the perception system and are not necessarily included in the above digital map 302. These transient dynamic objects may be provided from a different context object data stream input so that the motion planning system may appropriately rank and categorize all such transient dynamic objects and other dynamic objects located in the digital map 302 as noted above. Accordingly, data (e.g., detection or location of an emergency vehicle) generated by or transmitted from the perception engine 34 may be used to supplement the map data of the one or more maps 32 with data associated with the one or more dynamic objects detected in the environment, thereby providing a current or updated representation of the environment surrounding the autonomous vehicle.

In some embodiments, the generated digital map 302 can be consumed by a planner (also referred to as "planning engine", "planning system", or "planning subsystem") 36 to generate or plan a driving path for the autonomous vehicle. Alternatively, in some embodiments, the map layout 322, as well as the sensor data received by the perception engine 34 from sensors (radar, LIDAR, camera, etc.) of the autonomous vehicle, can be consumed by the planner 36 as separate input, to generate a driving path for the autonomous vehicle as output.

Further referring to FIG. 3, the perception engine 34 can, via the EV detector 342, receive sensor data (e.g., images, videos, audio data, etc.) detected by one or more sensors (e.g., the camera 138 from the primary sensor system 130), and process the sensor data to generate a perception output indicating whether an emergency vehicle is present within the environment of the autonomous vehicle. In response to the perception output indicating that an emergency vehicle is present within the environment of the autonomous vehicle, a local teleassist component 30 that is local to the autonomous vehicle can, at block 302, generate or trigger a teleassist request that requests to establish a teleassist session between the local teleassist component 30 of the autonomous vehicle and a remote teleassist system 38 (that is remote to the autonomous vehicle). The teleassist request can be automatically forwarded to the remote teleassist system 38 in response to the perception output indicating that an emergency vehicle is present within the environment of the autonomous vehicle.

The remote teleassist system 38, in response to receiving the teleassist request, can initiate a teleassist session (block 304). Once the teleassist session is established, the remote teleassist system 38 can receive sensor data associated with the emergency vehicle that is present within the environment of the autonomous vehicle, from one or more sensors disposed on the autonomous vehicle. Such sensor data may be received by the remote teleassist system 38 from the one or more sensors disposed on the autonomous vehicle, via the local teleassist component 30. The sensor data received by the remote teleassist system 38 can be, or can include at least part of the sensor data processed by the EV detector 342 in determining a presence of the emergency vehicle within the environment of the autonomous vehicle. Alternatively, the sensor data received by the remote teleassist system 38 can be completely different from the sensor data processed by the EV detector 342 in determining the presence of the emergency vehicle within the environment.

Subsequent to the initiation of the teleassist session, the remote teleassist system 38 can, at block 306, present a teleassist operator with the sensor data associated with the emergency vehicle. For instance, the remote teleassist system 38 can display one or more images (or a live video) of the sensor data via one or more displays, and/or display audio data of the sensor data via one or more speakers. After inspecting the sensor data (e.g., a live video showing the emergency vehicle approaching the autonomous vehicle from behind) associated with the emergency vehicle, at block 308, a teleassist operator having access to the remote teleassist system 38 can provide one or more teleassist operator inputs (sometimes referred to as "remote teleassist operator input") at a user interface (see, e.g., FIG. 8) of the remote teleassist system 38.

The one or more teleassist operator inputs can be, or can include, a first teleassist operator input that suggests a vehicle control operation to control operation of the autonomous vehicle in the environment within which the emergency vehicle is detected. For instance, the user interface of the remote teleassist system 38 can display a plurality of operations (e.g., "pull over", "stop", etc.) to control the autonomous vehicle in presence of an emergency vehicle, and the first teleassist operator input can be selection of one operation (e.g., "pull over"), of the plurality of operations, to control the autonomous vehicle.

Alternatively or additionally, the one or more teleassist operator inputs can be, or can include, a second teleassist operator input indicating or confirming a state (be it active or inactive) of the emergency vehicle, a location of the emergency vehicle, a type of the emergency vehicle, or other information about the emergency vehicle (e.g., simply confirming that an emergency vehicle is detected). For instance, the user interface of the remote teleassist system 38 can display a plurality of buttons each corresponding to a distinct aspect of the emergency vehicle (e.g., "active", "inactive"), and the second teleassist operator input can be selection of one button (e.g., "active"), of the one or more buttons, that characterizes the emergency vehicle.

As a non-limiting practical example, the remote teleassist system 38 can include a display, where a graphical user interface of the display can display the aforementioned one or more images (or the video) of the emergency vehicle within the environment of the autonomous vehicle, captured by one or more cameras local to the autonomous vehicle. The graphical user interface can, in addition to displaying the one or more images (or the video), include one or more selectable elements (e.g., virtual buttons, a textual description, a symbol, etc.) corresponding to one or more vehicle control operations suggested by the teleassist operator. As a non-limiting example, the one or more selectable elements can include a first selectable element that corresponds to "pull over to right shoulder", and when the teleassist operator selects the first selectable element (i.e., "pull over to right shoulder") in response to determining, from the one or more images (or the video), that the emergency vehicle is approaching the autonomous vehicle from behind, the remote teleassist system 38 receives, as a teleassist operator input, a recommended vehicle control operation of controlling the autonomous vehicle to pull over to right shoulder.

As another non-limiting example, the one or more selectable elements can include a second selectable element that corresponds to "stop driving". The teleassist operator, after inspecting the sensor data displayed via the graphical user interface and showing the emergency vehicle is driving in a same direction as the autonomous vehicle but in a different lane and is behind the autonomous vehicle, the teleassist operator may select the second selectable element (or click a physical button if applicable) to provide a teleassist operator input that recommends a vehicle control operation of stopping the autonomous vehicle.

Optionally, at block 310, the teleassist operator can continue monitoring the emergency vehicle via additional sensor data (if there is any) received from one or more sensors of the autonomous vehicle and displayed at the graphical user interface (and/or audible user interface), and/or provide additional teleassist operator input based on the additional sensor data.

Before ending the teleassist session, the remote teleassist system 38 can, at block 312, transmit the one or more teleassist operator inputs (e.g., the first teleassist operator input that suggests the vehicle control operation and/or the second teleassist operator input, or alternatively a vehicle control message generated based on the one or more teleassist operator inputs), back to the local teleassist component 30. In this case, the local teleassist component 30 can transmit the one or more teleassist operator inputs (or alternatively the vehicle control message) to the planner 36 to, for instance, update a driving path planned for the autonomous vehicle, where the updated driving path conforms to traffic rules exercised in the presence of an emergency vehicle.

For instance, after receiving the one or more teleassist operator inputs, the planner 36 can validate the one or more teleassist operator inputs. If the planner 36 validates the one or more teleassist operator inputs, the planner 36 can determine or update the driving path for the autonomous vehicle. If the planner 36 invalidates the one or more teleassist operator inputs, the planner 36 may discard the one or more teleassist operator inputs.

Optionally, the planner 36 can update the driving path planned for the autonomous vehicle based on: (1) the one or more teleassist operator inputs and/or (2) the digital map 302. Alternatively or additionally, the one or more teleassist operator inputs, after being validated, can be processed or utilized to control aspects of the autonomous vehicle other than a driving path. For instance, the one or more teleassist operator inputs, after being validated, can be utilized to control a speed or steering angle of the autonomous vehicle.

Optionally, at block 312, the remote teleassist system 38 can end the teleassist session. The remote teleassist system 38 can end the teleassist session in response to the teleassist operator input being transmitted to the local teleassist component 30. Alternatively, the remote teleassist system 38 can end the teleassist session after a predetermined period of time following the transmission of the teleassist operator input to the local teleassist component 30. Alternatively, the remote teleassist system 38 can end the teleassist session in response to receiving an input from the teleassist operator that ends the teleassist session. Alternatively, the remote teleassist system 38 can end the teleassist session in response to receiving a request from the local teleassist component 30 to end the teleassist session.

Figure 4A:
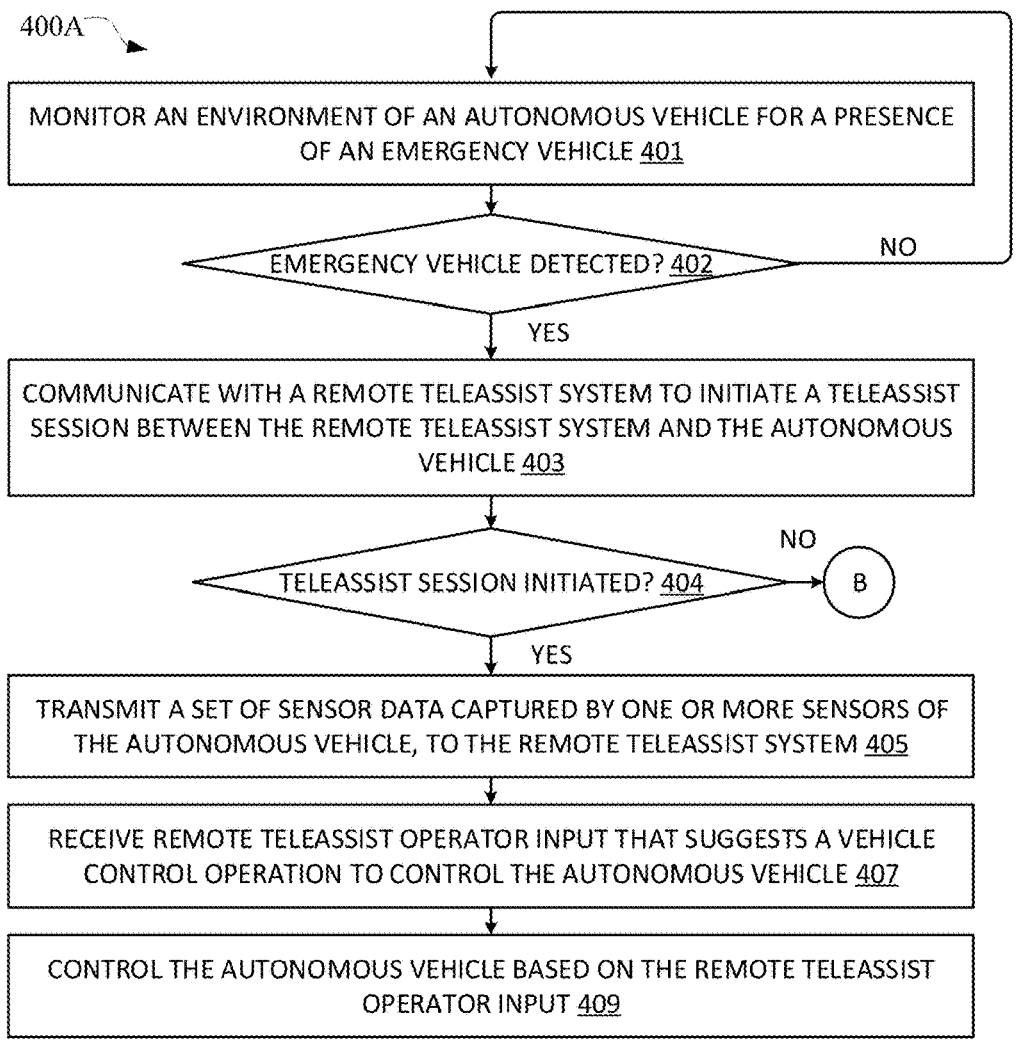
FIG. 4A and FIG. 4B illustrate an example method 400A of monitoring an environment of an autonomous vehicle for emergency vehicle(s).

FIG. 4A illustrates an example method 400A of monitoring an environment of an autonomous vehicle for emergency vehicle(s). The operations of the method 400A are described with reference to a system that performs the operations, where the system be, or can include an autonomous vehicle control system (e.g., 202 in FIG. 2A) local to an autonomous vehicle. The autonomous vehicle control system can include one or more processors, one or more memories, and/or other components. While the operations of the method 400 are shown in a particular order, this is not meant to be limiting, and one or more of the operations can be re-ordered, omitted, and/or additional operations can be added.

As shown in FIG. 4A, the system monitors, at block 401, an environment of an autonomous vehicle for any types of emergency vehicle(s) within the environment of the autonomous vehicle. As a non-limiting example, the environment can be an intersection at which the autonomous vehicle stops pursuant to a stop sign, or an environment, of the autonomous vehicle, that is within a field of view of one or more sensors of the autonomous vehicle. The environment can include one or more static objects (e.g., buildings, roads, parks, lakes, etc.) identifiable via one or more maps or other static objects (e.g., tree, etc.) not identifiable via the one or more maps. Optionally or additionally, the environment can further include one or more dynamic objects such as vehicles, pedestrians, animals, etc.

At block 402, the system (e.g., the autonomous vehicle control system) can determine whether an emergency vehicle is detected (i.e., present) within the environment of the autonomous vehicle. If the system determines that an emergency vehicle is present within the environment of the autonomous vehicle, continuing to block 403, the system can communicate with a remote teleassist system to initiate a teleassist session between the remote teleassist system and the autonomous vehicle. If the system determines that an emergency vehicle is not present within the environment of the autonomous vehicle, returning to block 403, the system can continue monitoring the environment of the autonomous vehicle for the presence of any emergency vehicle(s).

In some implementations, the system can determine whether an emergency vehicle is detected (i.e., present) within the environment of the autonomous vehicle, based on sensor data captured by one or more sensors of the autonomous vehicle. For example, one or more acoustic sensors, of the one or more sensors of the autonomous vehicle, can detect audio data capturing a siren. In this example, the system (e.g., via an autonomous vehicle control system local to the autonomous vehicle) can process the audio data capturing the siren to determine whether the siren is specific to any emergency vehicle, of a plurality of emergency vehicles. If the system determines that the siren is specific to an emergency vehicle, of the plurality of emergency vehicles, the system can determine that an emergency vehicle is present within the environment of the autonomous vehicle. If the system determines that the siren is not specific to any emergency vehicle, of the plurality of emergency vehicles, the system can determine that no emergency vehicle is present within the environment of the autonomous vehicle.

As another example, one or more image-capturing sensors (e.g., front-facing camera, rear-facing camera, and/or side cameras) can capture one or more images (or one or more videos, live or not live) depicting a vehicle within the environment (e.g., surrounding, behind, or in front of the autonomous vehicle) of the autonomous vehicle. In this example, the system can process the one or more images (or one or more video frames of the one or more videos) that depict the vehicle to determine whether the vehicle is an emergency vehicle. To determine whether the vehicle is an emergency vehicle, the system can, for instance, compare a visual appearance (e.g., shape, color logo on a vehicle body, color/shape of a flashing light, etc.) of the vehicle that is shown in the one or more images, to a plurality of emergency vehicles. The system can determine that the vehicle is an emergency vehicle (i.e., an emergency vehicle is present within the environment of the autonomous vehicle) if the visual appearance (key aspects such as a shape) of the vehicle matches any of the plurality of emergency vehicles. The system can determine that the vehicle is not an emergency vehicle (i.e., an emergency vehicle is not present within the environment of the autonomous vehicle) if the visual appearance (all aspects or a key portion thereof) of the vehicle does not match any of the plurality of emergency vehicles. For instance, a machine learning model trained to classify emergency vehicles can be utilized to process an image capturing a vehicle that surrounds the autonomous vehicle, as input, to generate a classification output indicating whether the captured vehicle is an emergency vehicle. The classification output can, alternatively or additionally, indicate whether the captured vehicle is an emergency vehicle of a particular type (e.g., ambulance, police vehicle, etc.).

As a non-limiting example, the system can determine (e.g., using one or more trained machine learning models) whether a shape and/or a color of the vehicle, being part of the visual appearance of the vehicle, matches any of the plurality of emergency vehicles. If the system determines that a shape and/or a color of the vehicle matches any of the plurality of emergency vehicles, the system can determine that an emergency vehicle is present within the environment of the autonomous vehicle. If the system determines that a shape and/or a color of the vehicle do not match any of the plurality of emergency vehicles, the system can determine that an emergency vehicle is not present within the environment of the autonomous vehicle.

Alternatively or additionally, the system can process (e.g., using one or more trained machine learning models) the one or more images to detect whether the visual appearance of the vehicle includes a logo (e.g., "Ambulance", or "Police") on a body of the vehicle that indicates the vehicle is an emergency vehicle. If the system determines that a logo (if any) of the vehicle matches any of the plurality of emergency vehicles, the system may determine that an emergency vehicle is present within the environment of the autonomous vehicle. If the system does not detect any logo from the visual appearance of the vehicle or determines that a logo of the vehicle does not match any of the plurality of emergency vehicles, the system can evaluate whether an emergency vehicle is present within the environment of the autonomous vehicle using other factors (e.g., siren, shape/color of vehicle, flashing light, etc.).

Alternatively or additionally, the system can process the one or more images to determine whether a color and/or a pattern of a flashing light (if there is any, which is often detected from a vehicle top) emitted by the vehicle matches that of any emergency vehicle. In this case, if the system determines that a color and/or a pattern of the flashing light matches an emergency vehicle, of the plurality of emergency vehicles, the system can determine that an emergency vehicle is present within the environment of the autonomous vehicle. If the system detects flashing light based on the sensor data captured by the one or more sensors of the autonomous vehicle but the flashing light does not match any of the plurality of emergency vehicles, the system may determine that an emergency vehicle is not present within the environment of the autonomous vehicle.

Figure 4B:
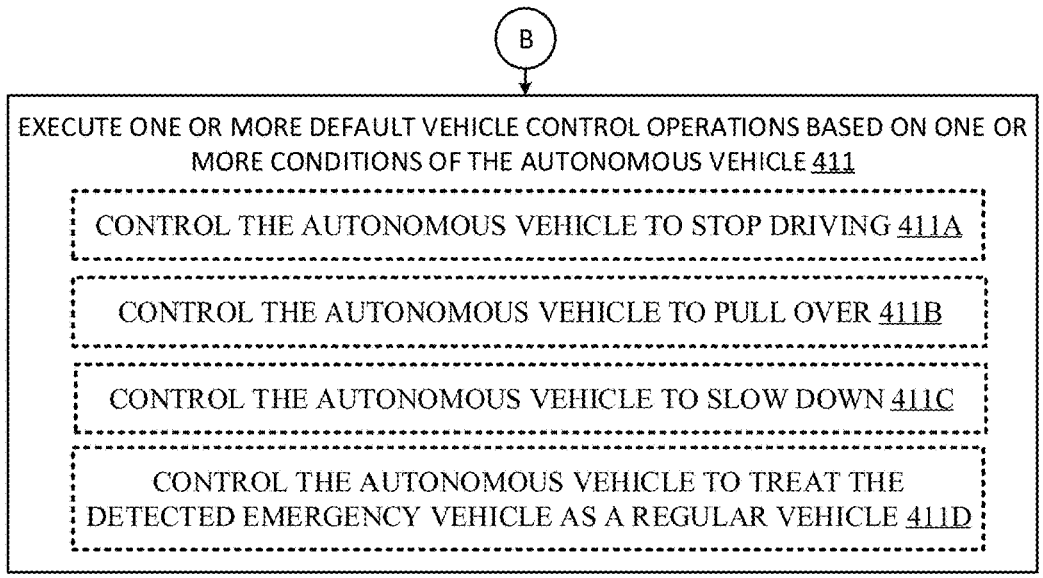

At block 404, the system (e.g., the autonomous vehicle control system) can determine whether a teleassist session is initiated. If the system determines that a teleassist session is initiated successfully, the system can transmit a set of sensor data (and/or other information) associated with the detected emergency vehicle, to the remote teleassist system (block 405). If the system determines that a teleassist session is not initiated successfully, the method 400A proceeds to point "B", where as shown in FIG. 4B, the system can execute one or more default vehicle control operations (block 411). The teleassist session may not be initiated successfully, for instance, when the teleassist system is not responding at all, or when the teleassist system fails to accept the request from the autonomous vehicle to initiate a teleassist session between the autonomous vehicle and the teleassist system. In some cases, the teleassist session may be considered as not being initiated successfully if the teleassist system does not respond to a request to communicate from the autonomous vehicle within the aforementioned predetermined period.

In some implementations, the set of sensor data transmitted to the remote teleassist system can be captured by the aforementioned one or more sensors (or a portion thereof). In some implementations, the set of sensor data transmitted to the remote teleassist system can include: the aforementioned sensor data using which the system determines whether an emergency vehicle is present within the environment of the autonomous vehicle, or a portion thereof. For instance, the set of sensor data transmitted to the remote teleassist system can include the one or more images depicting a vehicle that is determined to be an emergency vehicle, and/or the audio data capturing a siren specific to any emergency vehicle. As a practical example, the system may use the sensor data that includes audio data capturing a siren specific to an emergency vehicle to determine the presence of the emergency vehicle, and may transmit the set of sensor data including (1) the audio data capturing the siren specific to the emergency vehicle and (2) video data capturing the emergency vehicle approaching the autonomous vehicle from behind, to the remote teleassist system.

In some other implementations, the set of sensor data transmitted to the remote teleassist system can be the same as the aforementioned sensor data using which the system determines whether an emergency vehicle is present within the environment of the autonomous vehicle. In some other implementations, the set of sensor data transmitted to the remote teleassist system can be completely or partially different from the aforementioned sensor data using which the system determines whether an emergency vehicle is present within the environment of the autonomous vehicle. As a non-limiting practical example, while using the sensor data that includes audio data capturing a siren specific to an emergency vehicle, as well as one or more images depicting a visual appearance of the emergency vehicle, to determine the presence of the emergency vehicle, the system can transmit, to the remote teleassist system, the set of sensor data that including (1) the audio data capturing the siren specific to the emergency vehicle and (2) video data capturing the emergency vehicle approaching the autonomous vehicle from behind.

As another non-limiting practical example, the system can evaluate a first image at $T_1$ that captures an emergency vehicle approaching the autonomous vehicle from behind (e.g., within a distance of approximately 100 m) to determine/confirm the presence of the emergency vehicle within the environment of the autonomous vehicle, and can transmit a second image at $T_2$ capturing the emergency vehicle approaching the autonomous vehicle from behind (e.g., with a distance of approximately 80 m), where $T_2$ is subsequent to $T_1$.

Optionally, in addition to transmitting the set of sensor data associated with the detected emergency vehicle to the remote teleassist system, the system can further transmit other information to the remote teleassist system. For instance, the system can transmit, to the remote teleassist system, path data of the emergency vehicle indicating a location, a driving direction and/or a driving speed of the emergency vehicle at one or more points of time. The location of the emergency vehicle, for instance, can be determined based on LIDAR data captured using one or more LIDAR sensors, which can be a part of the aforementioned one or more sensors disposed on the autonomous vehicle. In the instance above, the system can alternatively or additionally transmit, to the remote teleassist system, a path or a trajectory of the emergency vehicle generated based on the path data.

In some implementations, the aforementioned one or more default vehicle control operations can include a first default vehicle control operation which controls the autonomous vehicle to stop driving (411A). Alternatively or additionally, the one or more default vehicle control operations can include a second default vehicle control operation which controls the autonomous vehicle to pull over to a road shoulder (411B). Alternatively or additionally, the one or more default vehicle control operations can include a third default vehicle control operation which controls the autonomous vehicle to slow down the speed of the autonomous vehicle (411C). Alternatively or additionally, the one or more default vehicle control operations can include a fourth default vehicle control operation which controls the autonomous vehicle to treat the emergency vehicle as a regular vehicle (411D) (e.g., if it is determined that the emergency vehicle is not active).

At block 407, the system can receive, from the teleassist system, one or more remote teleassist operator inputs relating to the emergency vehicle. The one or more teleassist operator inputs can be, or can include, a message or confirmation confirming detection of the emergency vehicle. Alternatively or additionally, the one or more teleassist operator inputs can be, or can include a message or confirmation indicating a type or state of the detected emergency vehicle. Alternatively or additionally, the one or more teleassist operator inputs, which can include a recommendation or suggestion that suggests a vehicle control operation (may also be referred to as "autonomous vehicle control operation") to control the autonomous vehicle.

In some implementations, the one or more remote teleassist operator inputs can be received by the teleassist system, and be transmitted by the teleassist system to the system (e.g., the autonomous vehicle control system) for the system to control the autonomous vehicle. In some implementations, the one or more remote teleassist operator inputs can be received by the teleassist system from a teleassist operator (sometimes referred to as "remote teleassist operator") via a user interface of the teleassist system, after the teleassist operator evaluates the set of sensor data associated with the detected emergency vehicle, where the set of sensor data is received and presented to the teleassist operator by the teleassist system.

At block 409, the system can control the autonomous vehicle based on the remote teleassist operator input. As a non-limiting example, when the remote teleassist operator input suggests the vehicle control operation of pulling over the autonomous vehicle, the system can control the autonomous vehicle to pull over in response to receiving the remote teleassist operator input that suggests such vehicle control operation.

Figure 4C:
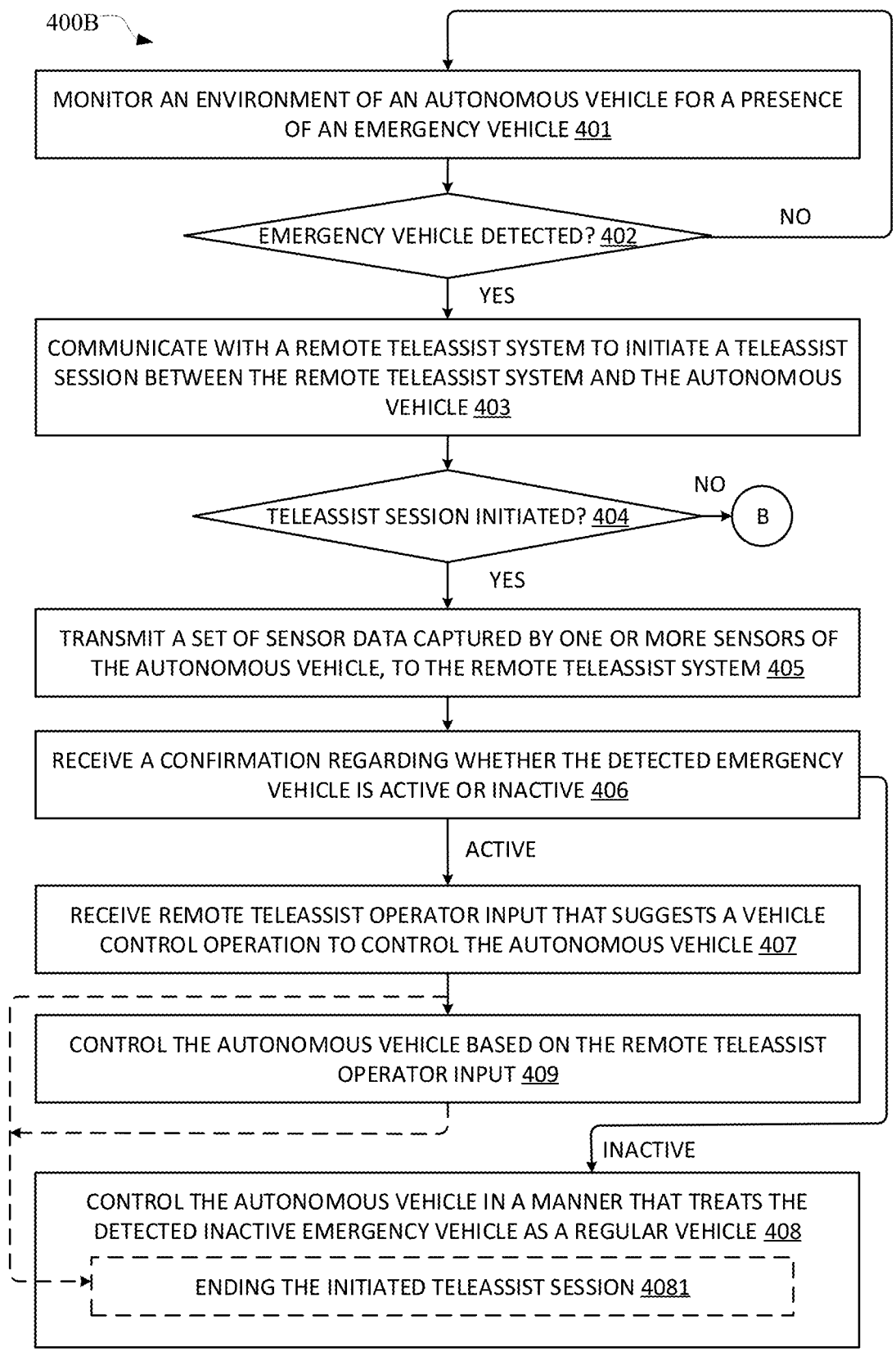
FIG. 4C, in view of FIG. 4B, illustrates an example method 400B of monitoring an environment of an autonomous vehicle for emergency vehicle(s).

In some implementations, referring to FIG. 4C, prior to receiving the recommendation or suggestion that suggests the vehicle control operation to control the autonomous vehicle from the teleassist system, at block 406, the system can receive a confirmation or message from the teleassist system indicating or confirming whether the emergency vehicle is active or inactive. The confirmation can be generated based on input from the teleassist operator, and/or can be generated based on using a trained machine learning model to process the aforementioned one or more images for detection of flashing light specific to any of a plurality of emergency vehicles. In this latter case, the confirmation may be generated based on an output of the trained machine learning model indicating whether flashing light specific to an emergency vehicle is detected. When the output of the trained machine learning model indicates that flashing light specific to an emergency vehicle is detected, the confirmation can indicate that the emergency vehicle is active.

In some implementations, the confirmation can be generated based on input from the teleassist operator. For instance, the teleassist operator may select a selectable element (displayed at the user interface of the teleassist system) corresponding to an "active" status/state for emergency vehicle, and a confirmation (e.g., message) indicating that the detected emergency vehicle is active can be generated in response to the operator selecting the selectable element corresponding to an "active" status/state. The teleassist operator can audibly select the selectable element, or click a mouse or touch a screen displaying the user interface, to select the selectable element.

In some implementations, the input from the teleassist operator that confirms an "active" status for the emergency vehicle can be based on the set of sensor data including audio data capturing a siren specific to one of a plurality of emergency vehicles, and/or video data indicating that a visual appearance of the detected emergency vehicle shows a flashing light emitted by the detected emergency vehicle. In some implementations, the input from the teleassist operator that confirms an "inactive" status for the emergency vehicle can be based on (i) audio data, of the set of sensor data, capturing no siren specific to one of a plurality of emergency vehicles, and (ii) video data, of the set of sensor data, indicating that a visual appearance of the detected emergency vehicle does not show any flashing light emitted by the detected emergency vehicle.

Referring again to FIG. 4C, in some implementations, when the system receives a confirmation from the teleassist system indicating that the emergency vehicle is active, the method can continue to block 407, at which, as described above, the system further receives remote teleassist operator input that suggests a vehicle control operation to control the autonomous vehicle.

Referring again to FIG. 4C, in some implementations, when the system receives a confirmation, from the teleassist system, indicating that the emergency vehicle is inactive, the method 400 arrives at block 408, at which the system can, for instance, control the autonomous vehicle in a manner that treats the detected inactive emergency vehicle as a regular vehicle. As a non-limiting example, the system can control the autonomous vehicle to stay in a current lane and/or to drive at a current speed, thereby treating the detected inactive emergency vehicle as a regular vehicle. In these implementations described herein, the system may not receive further remote teleassist operator input that suggests a vehicle control operation to control the autonomous vehicle, since the emergency vehicle is determined as inactive or as a "regular vehicle". Optionally, at block 4081, the system can end the initiated teleassist session in response to receiving the confirmation indicating that the emergency vehicle is inactive.

It's noted that while block 4081 in FIG. 4C is depicted as part of block 408, it can also be separate from block 408. For example, instead of ending the initiated teleassist session in response to receiving the confirmation indicating that the emergency vehicle is inactive, the system can end the initiated teleassist session when a predetermined period of time (e.g., 5 seconds) has passed since receiving the confirmation indicating that the emergency vehicle is inactive, where during such predetermined period of time, the system (e.g., the autonomous vehicle control system local to the autonomous vehicle) receives no further message (confirmation, teleassist operator input, etc.) from the teleassist system.

It's further noted that after receiving the remote teleassist operator input that suggests the vehicle control operation at block 407 in a situation where the emergency vehicle is determined to be active, the system can similarly proceed to end the initiated teleassist session at block 4081. In this situation, the system can end the initiated teleassist session, in response to receiving the remote teleassist operator input that suggests the vehicle control operation at block 407, or after the system controls the autonomous vehicle based on the remote teleassist operator input at block 409. Alternatively, the system can end the initiated teleassist session when a predefined period of time (the same as or different from the aforementioned predetermined period of time) has passed since receiving the remote teleassist operator input that suggestion the vehicle control operation, where during this predefined period of time, the system receives no additional remote teleassist operator input (or other message or instructions) from the teleassist system.

Figure 5:
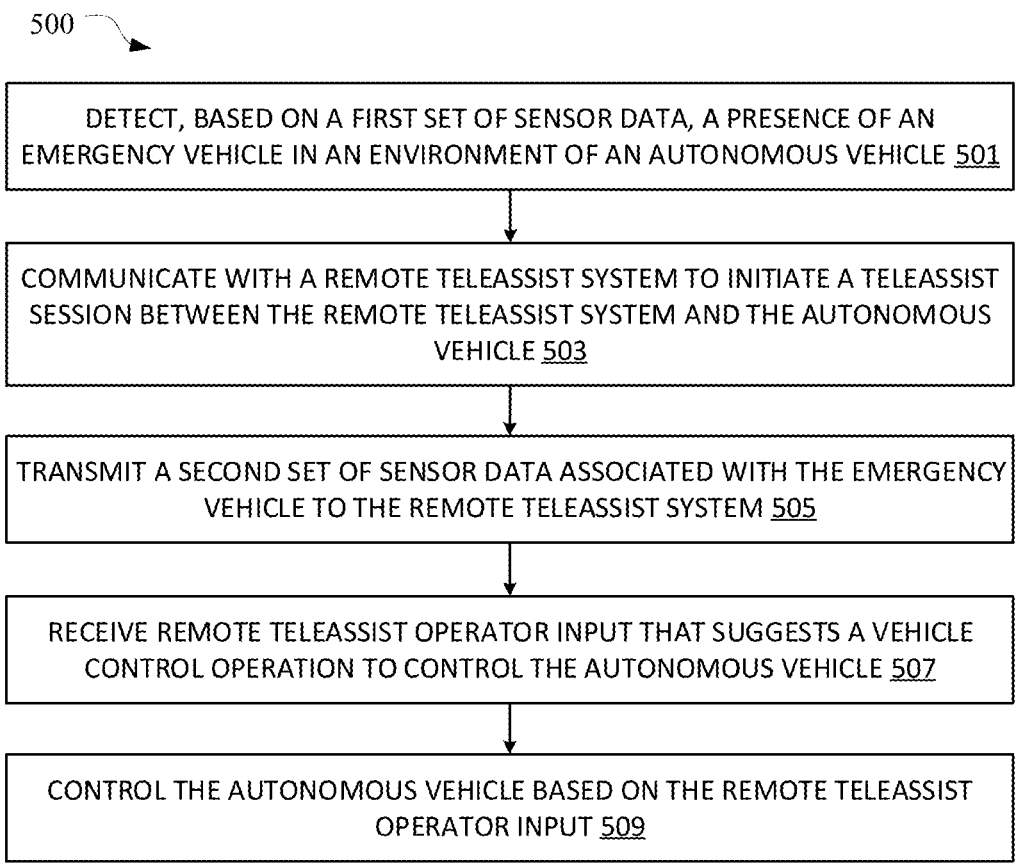
FIG. 5 illustrates an example method of controlling an autonomous vehicle to respond to an emergency vehicle that is detected within an environment of the autonomous vehicle.

FIG. 5 illustrates an example method 500 of controlling an autonomous vehicle to respond to an emergency vehicle that is detected within an environment of the autonomous vehicle. The operations of the method 500 are described with reference to an autonomous vehicle control system that performs the operations, where the autonomous vehicle control system is local to an autonomous vehicle and includes one or more processors, one or more memories, and/or other components. While the operations of the method 500 are shown in a particular order, this is not meant to be limiting, and one or more of the operations can be re-ordered, omitted, and/or additional operations can be added.

As shown in FIG. 5, the autonomous vehicle control system detects, based on a first set of sensor data, a presence of an emergency vehicle in an environment of an autonomous vehicle that accesses the autonomous vehicle control system locally. The environment can have one or more roads, one or more buildings, or other objects. The autonomous vehicle control system can be installed at the autonomous vehicle, and the autonomous vehicle can include one or more sensors (e.g., acoustic sensors, image-capturing sensors, GPS, etc.) disposed on the autonomous vehicle. In some cases, the environment can be, for example, an area within a field of view of the one or more sensors that are disposed on the autonomous vehicle.

In some implementations, the autonomous vehicle control system can process the first set of sensor data to detect a presence of an emergency vehicle in the environment of the autonomous vehicle. For instance, the first set of sensor data can include audio data, collected by one or more acoustic sensors, that captures a siren sent by the emergency vehicle. In this instance, the autonomous vehicle control system can determine the presence of the emergency vehicle based on the siren detected from the first set of sensor data being specific to one of a plurality of emergency vehicles.

Alternatively or additionally, the first set of sensor data can include one or more images (or videos) captured by the one or more image-capturing sensors (e.g., cameras, or video-capturing sensors), that describe a visual appearance (e.g., shape, color, logo on vehicle body, flashing light, etc.) of the emergency vehicle. In this instance, the autonomous vehicle control system can determine the presence of the emergency vehicle based on the visual appearance of the emergency vehicle that is specific to one of a plurality of emergency vehicles.

In some implementations, at block 503, in response to detecting the presence of the emergency vehicle in the environment of the autonomous vehicle, the autonomous vehicle control system can communicate with a teleassist system to initiate a teleassist session for communication or information exchange between the autonomous vehicle and the teleassist system. In some implementations, in response to the teleassist session being initiated successfully, at block 505, the autonomous vehicle control system can transmit a second set of sensor data to the teleassist system, where the second set of sensor data can be captured by the aforementioned one or more sensors (or a portion thereof) and is associated with one or more conditions of the emergency vehicle, which may be (but does not necessarily need to be) determined or partially determined using the first set of sensor data.

The second set of sensor data can be the same as the first set of sensor data. Alternatively, the second set of sensor data can be partially or completely different from the first set of sensor data. For instance, while the first set of sensor data (e.g., audio data capturing a siren specific to an emergency vehicle) allows the autonomous vehicle control system to detect the presence of the emergency vehicle, the second set of sensor data (e.g., the audio data capturing the siren specific to the emergency vehicle and video data capturing the emergency vehicle approaching the autonomous vehicle from behind) can indicate additional information (e.g., one or more conditions of the emergency vehicle such as whether the emergency vehicle is active or inactive, an approximate location, a speed, or a driving direction of the emergency vehicle, etc.) of the emergency vehicle, other than the presence of the emergency vehicle. In other words, in some instances, the second set of sensor data can include at least portion of the first set of sensor data, or the second set of sensor data can be captured entirely subsequent to the first set of sensor data so that the second set of sensor data includes no data from the first set of sensor data.

As a non-limiting practical example and for the sole purpose of illustration, the first set of sensor data can include: audio data at $T_1$ that captures a siren specific to an emergency vehicle, and a first image at $T_2$ that captures the emergency vehicle behind (e.g., 100 m behind) the autonomous vehicle, where $T_2$ is approximately the same as or subsequent to $T_1$. In this example, the second set of sensor data can at least include the first image capturing the emergency vehicle approximately 100 m behind the autonomous vehicle. Or, instead of or in addition to the first image, the second set of sensor data can include a second image capturing the emergency behind (e.g., 80 m behind) vehicle at a more recent point of time $T_3$, which is subsequent to $T_2$.

Optionally or additionally, the second set of sensor data transmitted to the remote teleassist system includes path data of the emergency vehicle indicating a location, a driving direction and/or a driving speed of the emergency vehicle at one or more points of time. In this case, the aforementioned one or more conditions of the emergency vehicle can further include a path or trajectory of the emergency vehicle generated based on the path data. Optionally, the location of the emergency vehicle, for instance, can be determined based on LIDAR data captured using one or more LIDAR sensors, which can be a part of the aforementioned one or more sensors.

In some implementations, after receiving the second set of sensor data from the autonomous vehicle control system, the teleassist system can cause the second set of sensor data (or a portion thereof, after processing the second set of sensor data) to be presented to a teleassist operator. For instance, the teleassist system can include one or more displays, and render image data, video data, or location data, etc., of the second set of sensor data, to the teleassist operator via the one or more displays. The teleassist system can alternatively or additionally include other components (e.g., speakers to deliver the audio data capturing a siren specific to an emergency vehicle) and more descriptions can be found later in this specification.

In some implementations, teleassist operator input that suggests or recommends one or more vehicle control operations to control operation of the autonomous vehicle responsive to the one or more conditions of the emergency vehicle can be received from the teleassist operator, via a user interface of the teleassist system. As a non-limiting example, the teleassist operator input can be a confirmation/message that an active ambulance is approaching the autonomous vehicle from behind, as well as a command or suggestion instructing the autonomous vehicle to pull over to the right shoulder as soon as possible. As another example, the teleassist operator input can include a click on a button corresponding to "emergency vehicle detected" and further include a click on a button corresponding to "pull over to the right shoulder as soon as possible".

Referring again to FIG. 5, at block 507, the autonomous vehicle control system can receive teleassist operator input that suggests the one or more vehicle control operations to the autonomous vehicle control system. The one or more vehicle control operations are to control the autonomous vehicle. At block 509, the autonomous vehicle control system can control operation of the autonomous vehicle based on the teleassist operator input, responsive to the presence and/or the one or more conditions of the emergency vehicle.

For instance, based on the teleassist operator input (e.g., selection of a selectable element displayed at a user interface of the teleassist system that displays a command of "pull over to right shoulder"), the autonomous vehicle control system can control the autonomous vehicle to pull over to the right shoulder.

Optionally, continuing with the instance above, the one or more vehicle control operations suggested by the teleassist operator input can include a further vehicle control operation of "continue driving along the shoulder", given that the second set of sensor data includes at least an image or a video showing no vehicles on the right shoulder. Alternatively, the further vehicle control operation of "continue driving at the shoulder" can be suggested by an additional teleassist operator input that is received from the teleassist system and that is subsequent to receiving the aforementioned teleassist operator input. The additional teleassist operator input here can be based on a third set of sensor data transmitted from the autonomous vehicle control system to the teleassist system, where the third set of sensor data for instance, includes an image or video showing no vehicle in front of the autonomous vehicle when the autonomous vehicle enters the shoulder or is driving along the shoulder.

In some implementations, the teleassist session may not be initiated successfully. For example, the teleassist system may not respond to a request from the autonomous vehicle control system to communicate, or the teleassist session may not be initiated within a predetermined period of time to be responsive. In these implementations, the autonomous vehicle control system can, in response to detecting the presence of the emergency vehicle in the environment of the autonomous vehicle, execute one or more default vehicle control operations. The one or more default vehicle control operations can, for instance, be determined based on one or more conditions of the autonomous vehicle, and/or based on the one or more conditions of the emergency vehicle indicated by the first or second set of sensor data.

As a non-limiting example, the one or more conditions of the autonomous vehicle can indicate that the autonomous vehicle is driving along a road, and the one or more default vehicle control operations include a first default vehicle control operation that controls the autonomous vehicle to stop driving. Alternatively, in this example, the one or more default vehicle control operations include a second default vehicle control operation that controls the autonomous vehicle to pull over to a shoulder of the road.

Further in this example, if the autonomous vehicle control system additionally determines, from the second set of sensor data, that the one or more conditions of the emergency vehicle indicate the emergency vehicle is approaching the autonomous vehicle from behind and is in the same lane as the autonomous vehicle, the one or more default vehicle control operations can include the second default vehicle control operation which controls the autonomous vehicle to pull over to a shoulder of the road, without including the first default vehicle control operation that controls the autonomous vehicle to stop driving.

As another non-limiting example, the one or more conditions of the emergency vehicle can indicate that the emergency vehicle is in an inactive state (meaning the emergency vehicle is used as a normal vehicle). In this example, the one or more default vehicle control operations can be, or include, for instance, an operation of controlling the autonomous vehicle to drive in a current lane at a current speed. In other words, in some cases, the autonomous vehicle control system may treat an inactive emergency vehicle as a normal vehicle, without performing particular control of the autonomous vehicle responsive to the detection of the inactive emergency vehicle.

Optionally, in some implementations, the autonomous vehicle control system, or the teleassist system, can detect or determine a type of the emergency vehicle. For instance, the autonomous vehicle control system can determine a type of the emergency vehicle based on determining that a siren captured by the aforementioned one or more sensors matches an emergency vehicle siren, of a plurality of emergency vehicle sirens that are respectively authorized to use by different types of emergency vehicles. In this instance, the autonomous vehicle control system can optionally transmit a message indicating the type of the emergency to the teleassist system during the aforementioned teleassist session. The message indicating the type of the emergency can be transmitted along with, prior to, or subsequent to the transmission of the second set of sensor data.

Alternatively or additionally, in another instance, the type of the emergency vehicle can also be determined based on a shape and/or a color of the emergency vehicle. Alternatively or additionally, in another instance, the type of the emergency vehicle can also be determined based on a flashing pattern and/or a color of a flashing light emitted by the emergency vehicle via one or more light-emitting devices (e.g., LED devices).

Optionally, in some implementations, the autonomous vehicle control system, or the teleassist system, can determine a state of the emergency vehicle indicating whether the emergency vehicle is active or inactive. Optionally, if the autonomous vehicle control system determines the state of the emergency vehicle, the autonomous vehicle control system can transmit a message indicating whether the emergency vehicle is active or inactive, to the teleassist system. As a non-limiting example, the autonomous vehicle control system can determine that the emergency vehicle is active based on the fact that the first set of sensor data includes the audio data capturing the siren sent by the emergency vehicle. In this example, the autonomous vehicle control system can transmit a message indicating that the emergency vehicle is active to the teleassist system.

Alternatively or additionally, the autonomous vehicle control system, or the teleassist system, can determine that the state of the emergency vehicle indicates that the emergency vehicle is active based on the visual appearance of the emergency vehicle captured in one or more images (or videos) that form a part of the first or second set of sensor data. For instance, the autonomous vehicle control system can process the one or more images (or videos) to determine whether flashing light having one or more particular features (e.g., color and/or pattern) specific to one of a plurality of emergency vehicles is detected (e.g., near a top of the emergency vehicle to which one or more LED devices are often attached).

By using the techniques described herein, one or more technical advantages can be achieved. As one non-limiting example, the techniques described herein enable the autonomous vehicle to receive teleassist operator input that recommends one or more operations in controlling the autonomous vehicle, in response to detecting an emergency vehicle in an environment of the autonomous vehicle. Here, the teleassist operator input can be generated based on sensor data collected by a plurality of sensors that are disposed at different areas of the autonomous vehicle and that are of different types and/or pointing angles. As a result, the autonomous vehicle can be controlled to drive appropriately in the environment within which an emergency vehicle is detected, by performing actions (e.g., stop) conforming to traffic rules applicable to situations involving emergency vehicles.

As one non-limiting example, the techniques described herein enable the autonomous vehicle control system and/or the teleassist system to determine whether an emergency vehicle is active or inactive via different types of sensor data. As a result, the autonomous vehicle can respond to active emergency vehicle(s) and inactive emergency vehicle(s) differently, thereby being smart in utilizing computational and/or network resources (e.g., by ending a teleassist session as soon as the emergency vehicle is detected to be inactive) while also being responsive (e.g., monitoring an active emergency vehicle at different points of time with corresponding responsive actions, such as stop, pull over, drive along a shoulder temporally, etc.).

Figure 6A:
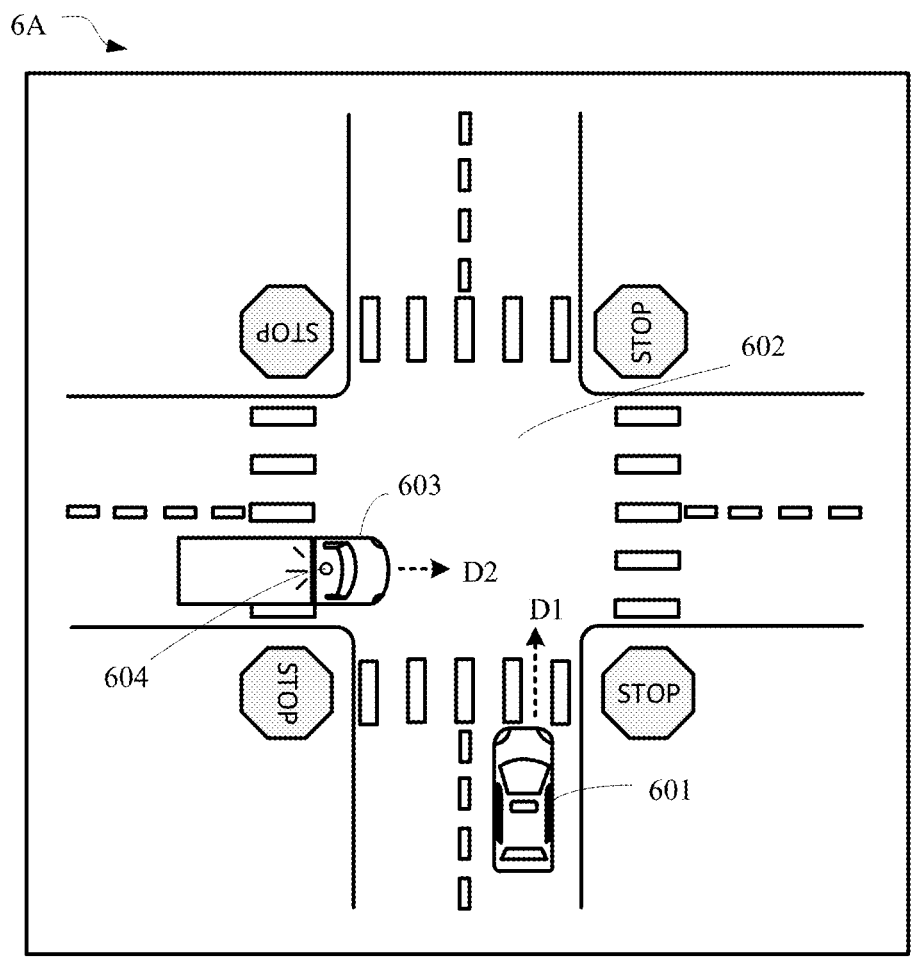
FIG. 6A and FIG. 6B respectively illustrates an example environment of an autonomous vehicle, where an emergency vehicle is detected within the environment of the autonomous vehicle 601.
Figure 6B:
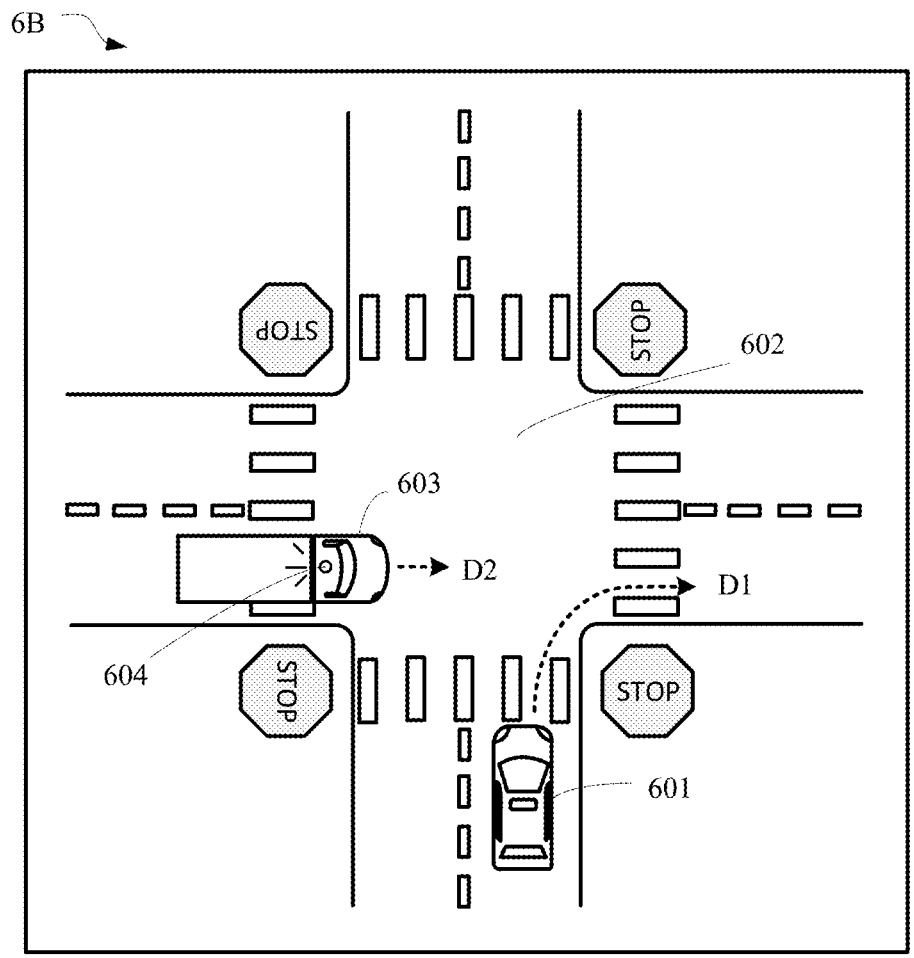

FIG. 6A illustrates an example environment 6A of an autonomous vehicle 601, where an emergency vehicle 603 is detected within the environment 6A of the autonomous vehicle 601. Similar to FIG. 6A, FIG. 6B illustrates an example environment 6B of an autonomous vehicle 601, where an emergency vehicle 603 is detected within the environment 6B of the autonomous vehicle 601. Referring to FIG. 6A or 6B, the autonomous vehicle 601 can arrive at a four-way intersection 602 earlier than the emergency vehicle 603, and is stopping pursuant to the stop sign posted at the four-way intersection. As a non-limiting example, one or more sensors of the autonomous vehicle 601 can detect sensor data capturing a siren sent by the emergency vehicle 603 and/or a flashing light 604 emitted by the emergency vehicle 603, prior to the emergency vehicle 603 approaching the four-way intersection (e.g., when the emergency vehicle 603 is about 50 meters away from the four-way intersection). In this example, the autonomous vehicle 601 can transmit the aforementioned sensor data (or a portion thereof), and/or additional sensor data associated with the emergency vehicle 603 and/or the autonomous vehicle 601, to a remote teleassist system, and can receive a teleassist operator input that recommends the autonomous vehicle 601 to continue stopping at a current location (instead of releasing the brake to start moving after a full stop at the stop sign).

The teleassist operator input can be received from a teleassist operator, via a user interface of the remote teleassist system. The teleassist operator input, for instance, can be based on the additional sensor data (e.g., live video) indicating or showing that the emergency vehicle 603 is in an active status, and is driving in a direction D2 at a high speed, without stopping at the four-way intersection 602. The additional sensor data can further indicate a location of the autonomous vehicle 601 and a planned driving direction D1 (see in FIG. 6A or FIG. 6B) of the autonomous vehicle 601, where if the autonomous vehicle 601 timely continues to drive along the driving direction D1 after stopping at the stop sign, instead of continuing to stop at the four-way intersection 602, the autonomous vehicle 601 will run into the emergency vehicle 603.

Based on the teleassist operator input that recommends the autonomous vehicle 601 to continue stopping at the current location, an autonomous vehicle control system that is local to the autonomous vehicle 601 can control the autonomous vehicle 601 to continue stopping at the current location, which presents potential collision and violation of traffic rules that are effective in a scenario involving an active emergency vehicle.

FIG. 7A, 7B, 7C, 7D, 7E, 7F respectively illustrates a corresponding example environment 700 of an autonomous vehicle 702, where a teleassist system or service is applied to handle an emergency vehicle 704 detected within the environment of the autonomous vehicle 702. As shown in FIG. 7A, the autonomous vehicle 702 can drive in a direction D1 along a lane 707, and the teleassist system can receive sensor data from the autonomous vehicle 702 indicating that the emergency vehicle 704 is active and is driving in a direction D2 along a lane 705 next to the lane 707, where the direction D2 is substantially the same as the direction D1. The teleassist system can further receive sensor data indicating that the emergency vehicle 704 is behind the autonomous vehicle 702 in a left lane (i.e., the lane 705). The teleassist system can present the received sensor data to a teleassist operator to receive a teleassist operator input that suggests one or more vehicle control operations for the autonomous vehicle 702. In the scenario of FIG. 7A, the teleassist operator input may suggest to control the autonomous vehicle 702 to stay in the current lane 707, and/or to slow down (or stop until the autonomous vehicle 704 passes the autonomous vehicle in the left lane 705), depending on local laws and regulations and safe operation in this scenario.

Referring to FIG. 7B, the autonomous vehicle 702 can drive in a direction D1 along the lane 707, and the teleassist system can receive sensor data from the autonomous vehicle 702 indicating that the emergency vehicle 704 is active and is driving in a direction D2 right behind the autonomous vehicle 702 along the same lane 707, where the direction D2 is substantially the same as the direction D1. The teleassist system can present the received sensor data to a teleassist operator to receive a teleassist operator input that suggests one or more vehicle control operations for the autonomous vehicle 702. In the scenario of FIG. 7B, the teleassist operator input may suggest to control the autonomous vehicle 702 to pull over to a right shoulder 709, given that the emergency vehicle 704 is approaching the autonomous vehicle 702 from behind at a high speed. Optionally or additionally, the teleassist operator input (or an additional teleassist operator input received subsequent to the teleassist operator input) may suggest to continue driving the autonomous vehicle 702 along the right shoulder 709, given that there is no vehicle in the right shoulder ahead of the autonomous vehicle 702 once the autonomous vehicle enters the right shoulder. The suggestions in the teleassist operator input can be modified subject to local laws and regulations and safe operation in this scenario.

Referring to FIG. 7C, the autonomous vehicle 702 can drive in a direction D1 along the lane 707, and the teleassist system can receive sensor data from the autonomous vehicle 702 indicating that the emergency vehicle 704 is active and is driving in a direction D2 behind the autonomous vehicle 702 along the same lane 707, where the direction D2 is substantially the same as the direction D1. The teleassist system can present the received sensor data to a teleassist operator to receive a teleassist operator input that suggests one or more vehicle control operations for the autonomous vehicle control. In the scenario of FIG. 7C, the teleassist operator input may suggest controlling the autonomous vehicle 702 to pull over to a right shoulder 709, given that the emergency vehicle 704 is approaching the autonomous vehicle 702 from behind at a high speed. The suggestions in the teleassist operator input can be modified subject to local laws and regulations and safe operation in this scenario.

In some implementations, the teleassist operator input (or an additional teleassist operator input received subsequent to the teleassist operator input) in the scenario of FIG. 7C may further suggest (depending on applicable local laws and regulations and safe operation requirement) stopping the autonomous vehicle 702 in the right shoulder 709 as soon as the autonomous vehicle enters the right shoulder 709, if a vehicle 703 (e.g., a regular vehicle) is being parked in the right shoulder 709, ahead of the autonomous vehicle 702. It's noted that in reality, the vehicle 703 may be parked in the right shoulder due to reasons such as an unexpected mechanical breakdown or out of gasoline, which is not uncommon.

Alternatively, if the vehicle 703 in FIG. 7C is being parked in the right shoulder 709 way ahead of the autonomous vehicle 702, the aforementioned teleassist operator input (or an additional teleassist operator input) may suggest, depending on applicable local laws and regulations and safe operation requirement, controlling the autonomous vehicle 702 to move towards the vehicle 703 and then stay in a queue with the vehicle 703, until the emergency vehicle 704 passes the autonomous vehicle 702.

Alternatively, if the vehicle 703 in FIG. 7C is driving slowly in the right shoulder 709, the teleassist operator input (or an additional teleassist operator input) may suggest, depending on applicable local laws and regulations and safe operation requirement, controlling the autonomous vehicle 702 to drive slowly along the right shoulder 709 following a pace of the vehicle 703. Here, the vehicle 703 may be determined to be parking (or driving slowly) ahead of the autonomous vehicle 702 in the right shoulder 709, using one or more sensors (e.g., a front-facing camera) of the autonomous vehicle 702.

Referring to FIG. 7D, the autonomous vehicle 702 can drive in a direction D1 along the lane 705, and the teleassist system can receive sensor data (e.g., via a front-facing camera) from the autonomous vehicle 702 indicating that the emergency vehicle 704 is active and is driving in a direction D2 opposite to the direction D1 along a lane 711, where the lane 711 is adjacent to the lane 705. The teleassist system can present the received sensor data to a teleassist operator to receive a teleassist operator input that suggests one or more vehicle control operations for controlling the autonomous vehicle 702, depending on applicable local laws and regulations and safe operation requirement. In the scenario of FIG. 7D, the teleassist operator input may suggest to control the autonomous vehicle 702 to stay in the lane 705 and to drive at a current speed, given that the autonomous vehicle 702 and the emergency vehicle 704 are driving in opposite directions and are in different lanes.

Referring to FIG. 7E, the autonomous vehicle 702 can drive in a direction D1 along the lane 707, and the teleassist system can receive sensor data from a rear-facing camera and/or acoustic sensor(s) of the autonomous vehicle 702 indicating that the emergency vehicle 704, while driving in a direction D2 that is substantially the same as the direction D1 and is in the same lane 707 right behind the autonomous vehicle 702, issues no siren nor flashing light. The teleassist system can present such received sensor data to a teleassist operator to receive a teleassist operator input that suggests one or more vehicle control operations to control the autonomous vehicle 702. In the scenario of FIG. 7E, the sensor data can indicate that the emergency vehicle 704 is inactive, and the teleassist operator input may suggest to control the autonomous vehicle 702 to stay in the lane 707 and to drive at a current speed, thereby treating the emergency vehicle 704 as a regular vehicle ("non-emergency vehicle"). The suggestion(s) in the teleassist operator input can depend on applicable local laws and regulations and safe operation requirement.

Referring to FIG. 7F, the autonomous vehicle 702 can drive in a direction D1 along the lane 707, and the teleassist system can receive sensor data from the autonomous vehicle 702 indicating that the emergency vehicle 704 which is driving ahead of the autonomous vehicle 702, in a direction D2 that is substantially the same as the direction D1 and along the lane 707, suddenly turns on its siren (e.g., a police car finding another vehicle ahead speeding) to be active. The teleassist system can present the received sensor data to a teleassist operator to receive a teleassist operator input that suggests one or more vehicle control operations for controlling the autonomous vehicle 702. In the scenario of FIG. 7F, the teleassist operator input may suggest to control the autonomous vehicle 702 to stay in the lane 707, and/or to slow down depending on a speed of the active emergency vehicle 704, depending on applicable local laws and regulations and safe operation requirement. It's noted that the examples shown in FIGS. 7A~7F are for illustration only, and are not intended to be limiting. Further, from these and other examples, training samples including: (1) the sensor data transmitted by the autonomous vehicle 702 to the teleassist system, and (2) the corresponding teleassist operator input that suggests one or more vehicle control operations for controlling the autonomous vehicle 702, can be collected or selected to train one or more machine learning models.

For example, a machine learning model can be trained using sensor data transmitted by the autonomous vehicle 702 to the teleassist system for receiving the corresponding teleassist operator input in the scenario of FIG. 7E, as input, to generate a corresponding output. In this example, the corresponding output can be compared with the corresponding teleassist operator input (which may be applied as ground truth command suggestion) in the scenario of FIG. 7E, to determine a difference, where the difference can be used to adjust one or more weights or parameters of the machine learning model.

Figure 8:
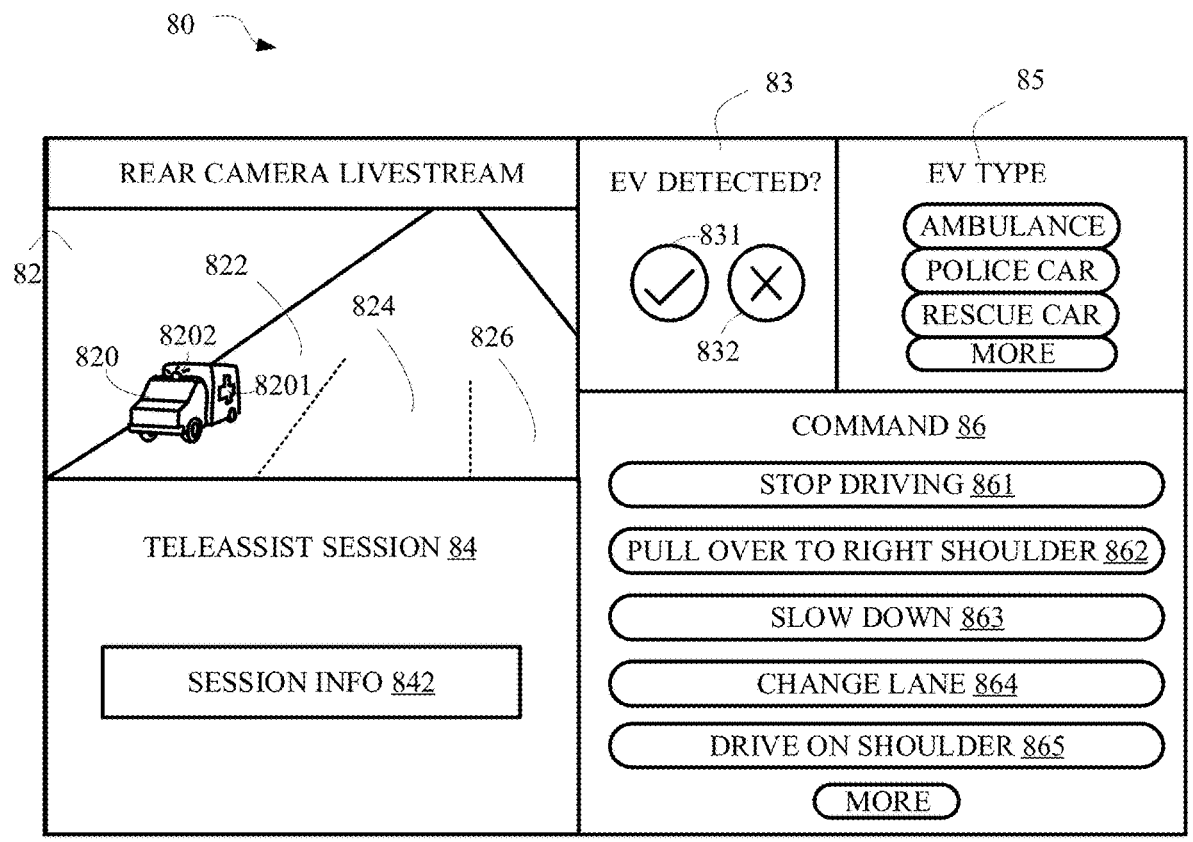
FIG. 8 illustrates a non-limiting example of a graphical user interface of a teleassist system to receive one or more remote teleassist operator inputs (sometimes simply referred to as "teleassist operator inputs").

FIG. 8 illustrates a non-limiting example of a graphical user interface 80 of a teleassist system. As shown in FIG. 8, the user interface 80 of the teleassist system can include a section 82 displaying one or more camera live streams, a section 84 representing a current teleassist session, one or more interactive sections such as 83, 85 and 86, that respectively displays one or more selectable elements, for selection by a teleassist operator that accesses the teleassist system. In the example shown in FIG. 8, the section 82 can display a camera livestream (e.g., titled "rear camera livestream") captured by a rear camera that is disposed on an autonomous vehicle which establishes the current teleassist session with the teleassist system. Referring to FIG. 8, the rear camera livestream can indicate that an active ambulance 820 is driving in a lane 822 next to a current lane 824 of the autonomous vehicle and that the active ambulance 820 is behind the autonomous vehicle. Optionally, the camera livestream 82 can further indicate that no vehicle is found/detected behind the autonomous vehicle in a lane 826, which is next to the lane 824 of the autonomous vehicle.

Optionally, instead of or in addition to the camera livestream provided by the rear camera of the autonomous vehicle, the section 82 can include a camera livestream provided by a front-facing camera or a side camera of the autonomous vehicle. Alternatively or additionally, the section 82 can include one or more images (e.g., cropped or enlarged image) capturing, for instance, the active ambulance 82, or a portion (e.g., a logo 8201 representing "ambulance", flashing light device 8202 that emits a flashlight specific to an ambulance) of the active ambulance 82. The one or more images can be displayed as an overlay of the camera livestream, can be displayed not overlapping the camera livestream, or can be displayed in response to the teleassist operator selecting a button (e.g., visually within the section 82 or physically presented in a physical console controller) that triggers the display of image data received from the autonomous vehicle. Examples described herein or below, however, are not intended to be limiting, and the section 82 or other portions of the graphical user interface 80 can be configured in other applicable manners.

Referring to FIG. 8, the section 83 can be configured to receive an input from a teleassist operator confirming whether or not an emergency vehicle is detected. For instance, by selecting a symbol 831 that corresponds to "YES", the input confirms that an emergency vehicle is detected (which is the case depicted in FIG. 8), and by selecting a symbol 832 that corresponds to "NO", the input confirms that an emergency vehicle is not detected. Alternatively or additionally, the section 83 can be configured to receive an input from a teleassist operator indicating whether an emergency vehicle is active or not active ("inactive"). For instance, the teleassist operator can determine that an emergency vehicle is an active ambulance after reviewing the rear camera livestream in the section 82, and responsively provide a teleassist operator input confirming that the emergency vehicle is "active" by selecting a symbol "YES" that corresponds to an active state of the emergency vehicle. Here, with teleassist, a remote system or operator may be placed in communication with an autonomous vehicle to assist with detecting, identification, and/or responding to an emergency vehicle, and as such, it is desirable for a teleassist system to efficiently and reliably support teleassist for autonomous vehicles.

Referring to FIG. 8, the section 85 can be configured to receive an input from a teleassist operator indicating a type of the detected emergency vehicle. For instance, the section 85 can display one or more selectable elements each corresponding to a type of emergency vehicle (e.g., "ambulance", "police car", "rescue car", etc.). In the scenario of FIG. 8, the input from the teleassist operator can be a selection of "ambulance". Such input indicating that the detected emergency vehicle is an ambulance may or may not be transmitted to the autonomous vehicle. For instance, instead of transmitting a message indicating that the detected emergency vehicle is an ambulance to the autonomous vehicle, the teleassist system can, in response to receiving the input indicating that the detected emergency vehicle is an ambulance, trigger the display of additional section(s) or a drop-down menu that are tailored to an "ambulance" scenario. The additional section(s) or the drop-down menu can be displayed via the graphical user interface 80, for the teleassist system to receive input from the teleassist operator tailored to ambulance-type emergency vehicle, where the input can be a teleassist operator input that suggests a vehicle control operation as described previously. Optionally, the input indicating that the detected emergency vehicle is an ambulance can cause the refresh of the section 86 which is configured to display one or more commands recommended to operate the autonomous vehicle in the presence of a detected emergency vehicle. In this case, the refresh results in an update or adjustment to the one or more commands, so that the updated or adjusted one or more commands are commands specific to handling situations involving ambulance(s).

Referring to FIG. 8, the section 86 can be configured to receive an input from a teleassist operator suggesting one or more commands from a plurality of commands. The one or more command displayed at the section 86 can include, for instance, a first command 861 of "stop driving", a second command 862 of "pull over to right shoulder", a third command 863 of "slow down", a fourth command 864 of "change lane", a fifth command 865 of "drive on shoulder", and other commands (e.g., "drive as it is", etc.) from the plurality of commands. As mentioned above, as a non-limiting example, the one or more commands displayed in the section 86 can be tailored command(s) selected from the plurality of commands, where the tailored command(s) provided in response to the detected emergency vehicle being determined as an "active ambulance". The one or more commands described herein are for the purpose of illustration, and are not intended to be limiting.

Optionally, the graphical user interface 80 can further include a section 84 providing session information 842 of a current teleassist session and/or pass teleassist session(s), specific to the autonomous vehicle. For example, for different autonomous vehicles, the section 84 may display a respective history of teleassist sessions between a respective autonomous vehicle and the teleassist system. The session information 842 can include, for instance, a duration of the current teleassist session, a current date and time, a location of the autonomous vehicle, a speed or direction of the autonomous vehicle, other information (e.g., a vehicle number that tracks or represents the autonomous vehicle, the digital map as described previously) transmitted from the autonomous vehicle, or other information detected by the teleassist system regarding the current teleassist system, etc.

It will be appreciated that, while certain features may be discussed herein in connection with certain implementations and/or in connection with certain figures, unless expressly stated to the contrary, such features generally may be incorporated into any of the implementations discussed and illustrated herein. Moreover, features that are disclosed as being combined in some implementations may generally be implemented separately in other implementations, and features that are disclosed as being implemented separately in some implementations may be combined in other implementations, so the fact that a particular feature is discussed in the context of one implementation but not another should not be construed as an admission that those two implementations are mutually exclusive of one another. Other variations will be apparent to those of ordinary skill. For example, various components of the aforementioned autonomous vehicle control system of an autonomous vehicle may be implemented using one or more trained machine learning models. For instance, the aforementioned EV detector can include a machine learning model trained to detect an emergency vehicle based on processing one or more images captured by camera(s) of the autonomous vehicle, where the one or more images depict a vehicle that has a specific vehicle shape, vehicle color, logo on vehicle body, and/or flashing light color/pattern specific to an emergency vehicle. As another instance, the aforementioned EV detector can further include a machine learning model trained to determine whether audio data collected by an acoustic sensor of the autonomous vehicle includes a siren specific to an emergency vehicle, of a plurality of emergency vehicles.

What is claimed is:

1. An autonomous vehicle control system comprising one or more processors configured to operate an autonomous vehicle in an environment by:
   detecting, based on a first set of sensor data captured by one or more sensors disposed on the autonomous vehicle, a presence of an emergency vehicle in the environment of the autonomous vehicle;
   in response to detecting the presence of the emergency vehicle in the environment of the autonomous vehicle, communicating with a remote teleassist system to initiate a teleassist session with the remote teleassist system; and
   in response to the teleassist session being initiated:
      transmitting a second set of sensor data captured by the one or more sensors to the remote teleassist system, and
      receiving remote teleassist operator input relating to the emergency vehicle, wherein the remote teleassist operator input is based on one or more conditions of the emergency vehicle determined from the second set of sensor data transmitted to the remote teleassist system.

2. The autonomous vehicle control system of claim 1, wherein one or more of the processors is further configured to operate the autonomous vehicle in the environment by:
   executing the vehicle control operation suggested by the teleassist operator input received from the remote teleassist system.

3. The autonomous vehicle control system of claim 1, wherein one or more of the processors is further configured to operate the autonomous vehicle in the environment by:
   in response to the teleassist session not being initiated:
      executing one or more default vehicle control operations based on one or more conditions of the autonomous vehicle.

4. The autonomous vehicle control system of claim 3, wherein:
   the one or more conditions of the autonomous vehicle indicate that the autonomous vehicle is driving along a road, and
   the one or more default vehicle control operations include at least: a first default vehicle control operation that controls the autonomous vehicle to stop driving, or a second default vehicle control operation that controls the autonomous vehicle to pull over to a shoulder of the road.

5. The autonomous vehicle control system of claim 1, wherein the second set of sensor data transmitted to the remote teleassist system includes at least portion of the first set of sensor data used to detect the emergency vehicle.

6. The autonomous vehicle control system of claim 1, wherein:
the one or more sensors disposed on the autonomous vehicle include one or more acoustic sensors, and
the first set of sensor data used to detect the emergency vehicle includes audio data, captured by the one or more acoustic sensors, of a siren emitted by the emergency vehicle.

7. The autonomous vehicle control system of claim 6, wherein one or more of the processors is further configured to:
detect the presence or a type of the emergency vehicle in the environment of the autonomous vehicle, based on determining that the siren matches an emergency vehicle siren, of a plurality of emergency vehicle sirens that are respectively authorized to be used by different types of emergency vehicles.

8. The autonomous vehicle control system of claim 6, wherein the one or more conditions of the emergency vehicle includes a state of the emergency vehicle indicating whether the emergency vehicle is active or inactive, and wherein one or more of the processors is further configured to:
determine that the state of the emergency vehicle indicates that the emergency vehicle is active based on the first set of sensor data including the audio data for the siren emitted by the emergency vehicle.

9. The autonomous vehicle control system of claim 6, wherein the second set of sensor data transmitted to the remote teleassist system includes:
the audio data for the siren emitted by the emergency vehicle.

10. The autonomous vehicle control system of claim 1, wherein:
the one or more sensors disposed on the autonomous vehicle include one or more imaging sensors, and
the first set of sensor data used to detect the emergency vehicle includes one or more images, captured by the one or more imaging sensors, that describe a visual appearance of the emergency vehicle.

11. The autonomous vehicle control system of claim 10, wherein one or more of the processors is further configured to: detect the presence of the emergency vehicle in the environment of the autonomous vehicle based on the visual appearance of the emergency vehicle that is described in the one or more images.

12. The autonomous vehicle control system of claim 10, wherein one or more of the processors is further configured to:
determine a type of the emergency vehicle based on:
a shape and/or color of the emergency vehicle, captured in the one or more images, or
a flashing pattern and/or color of a flashing light of the emergency vehicle, captured in the one or more images.

13. The autonomous vehicle control system of claim 12, wherein one or more of the processors is further configured to:
after the teleassist session is initiated, transmit data indicating the determined type of the emergency vehicle to the remote teleassist system.

14. The autonomous vehicle control system of claim 10, wherein the second set of sensor data transmitted to the remote teleassist system includes:
the one or more images that describe the visual appearance of the emergency vehicle.

15. The autonomous vehicle control system of claim 10, wherein the one or more conditions of the emergency vehicle includes a state of the emergency vehicle indicating whether the emergency vehicle is active or inactive, and wherein one or more of the processors is further configured to:
determine the state of the emergency vehicle based on whether a flashing light specific to the emergency vehicle is detected in the one or more images; and
determine that the state of the emergency vehicle indicates that the emergency vehicle is active when the flashing light specific to the emergency vehicle is detected in the one or more images.

16. The autonomous vehicle control system of claim 10, wherein one or more of the processors is further configured to:
determine, based on the first set of sensor data, whether the emergency vehicle is active or inactive; and
after the teleassist session is initiated, transmit data indicating whether the emergency vehicle is active or inactive to the remote teleassist system.

17. The autonomous vehicle control system of claim 1, wherein the second set of sensor data transmitted to the remote teleassist system includes path data of the emergency vehicle indicating:
a driving direction and/or a driving speed of the emergency vehicle at one or more points of time.

18. The autonomous vehicle control system of claim 17, wherein the one or more conditions of the emergency vehicle further includes the path data of the emergency vehicle.

19. The autonomous vehicle control system of claim 1, wherein the second set of sensor data transmitted to the remote teleassist system includes location data of the emergency vehicle indicating:
a location of the emergency vehicle at one or more points of time.

20. The autonomous vehicle control system of claim 19, wherein the one or more sensors include one or more (light detection and ranging) LIDAR sensors, and the location of the emergency vehicle is determined based on LIDAR data captured by the one or more LIDAR sensors.

21. The autonomous vehicle control system of claim 1, wherein the remote teleassist operator input specifies
pulling over the autonomous vehicle, stopping the autonomous vehicle, slowing down the autonomous vehicle, changing a lane of the autonomous vehicle, driving along a road shoulder, making a turn, or continuing to drive the autonomous vehicle in a current lane.

22. The autonomous vehicle control system of claim 1, wherein the teleassist operator input confirms the presence of the emergency vehicle.

23. The autonomous vehicle control system of claim 1, wherein the teleassist operator input is indicative of a state of the emergency vehicle.

24. The autonomous vehicle control system of claim 1, wherein the teleassist operator input suggests a vehicle control operation to control operation of the autonomous vehicle in the environment having the presence of the autonomous vehicle.

25. A teleassist system that is remote to an autonomous vehicle operating in an environment, the teleassist system comprising one or more processors configured to:
  communicating with the autonomous vehicle to initiate a teleassist session with the autonomous vehicle in response to the autonomous vehicle detecting a presence of an emergency vehicle in the environment;
  receiving, from the autonomous vehicle, sensor data captured by one or more sensors disposed on the autonomous vehicle;
  presenting at least portion of the sensor data received from the autonomous vehicle to a teleassist operator;
  receiving, from the teleassist operator and via a user interface of the teleassist system, teleassist operator input that suggests a vehicle control operation to control operation of the autonomous vehicle in the presence of the emergency vehicle; and
  communicating to the autonomous vehicle the teleassist operator input that suggests the vehicle control operation to control the operation of the autonomous vehicle.

26. A computer-implemented method, comprising:
  detecting, by at least one processor of an autonomous vehicle and based on a first set of sensor data captured by one or more sensors disposed on the autonomous vehicle, a presence of an emergency vehicle in the environment of the autonomous vehicle;
  in response to detecting the presence of the emergency vehicle in the environment of the autonomous vehicle, communicating with a remote teleassist system to initiate a teleassist session with the remote teleassist system; and
  in response to the teleassist session being initiated:
    transmitting a second set of sensor data captured by the one or more sensors to the remote teleassist system, and
    receiving remote teleassist operator input that suggests a vehicle control operation to control operation of the autonomous vehicle in the environment having the presence of the emergency vehicle,
      wherein the remote teleassist operator input is based on one or more conditions of the emergency vehicle determined from the second set of sensor data captured by the one or more sensors transmitted to the remote teleassist system.

* * * * *